US012615352B2

(12) United States Patent　　　　　(10) Patent No.: US 12,615,352 B2
Choi et al.　　　　　　　　　　　　　(45) Date of Patent: Apr. 28, 2026

(54) ELECTRONIC DEVICE AND OPERATION METHOD THEREOF

(71) Applicant: SAMSUNG ELECTRONICS CO., LTD., Suwon-si (KR)

(72) Inventors: Eunseok Choi, Suwon-si (KR); Sungho Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 18/238,127

(22) Filed: Aug. 25, 2023

(65) Prior Publication Data

US 2024/0048675 A1　Feb. 8, 2024

Related U.S. Application Data

(63) Continuation of application No. PCT/KR2023/011494, filed on Aug. 4, 2023.

(30) Foreign Application Priority Data

Aug. 5, 2022　(KR) ........................ 10-2022-0098122
Oct. 4, 2022　(KR) ........................ 10-2022-0126590

(51) Int. Cl.
　H04N 9/31　　　　(2006.01)
　G03B 21/14　　　 (2006.01)
(52) U.S. Cl.
　CPC ......... H04N 9/3194 (2013.01); G03B 21/142 (2013.01); H04N 9/3185 (2013.01)
(58) Field of Classification Search
　CPC .. G03B 23/00; G03B 21/00–64; G03B 21/16; G03B 21/147; G03B 21/142;
(Continued)

(56) References Cited

U.S. PATENT DOCUMENTS 6,520,647 B2　2/2003　Raskar
8,322,863 B1 *　12/2012　Cho ...................... H04N 9/3185
　　　　　　　　　　　　　　　　　　353/70
(Continued)

FOREIGN PATENT DOCUMENTS

JP　　2002-268142 A　　9/2002
JP　　2003-283963 A　　10/2003
(Continued)

OTHER PUBLICATIONS

A normal engineering student, "[Aeronautical Engineering] Aircraft Control—Eulerian Angle", Dec. 20, 2020, 18 pages, url: https://normal-engineer.tistory.com/35.
(Continued)

*Primary Examiner* — John W Miller
*Assistant Examiner* — Humam M Satti
(74) *Attorney, Agent, or Firm* — Sughrue Mion, PLLC

(57)　　　　　ABSTRACT

An electronic device includes: a sensing unit including a sensor; a memory storing one or more instructions; and one or more processors configured to execute the one or more instructions stored in the memory to: obtain, based on raw data received from the sensor, a rotation angle of the electronic device, determine, based on a difference value for a preset time period in at least one of the raw data or the rotation angle, whether the sensor is stable, in response to determining that the sensor is stable, determine whether the rotation angle is greater than or equal to a reference rotation angle, and in response to determining that the rotation angle is greater than or equal to the reference rotation angle, perform, based on the rotation angle, image processing for keystone correction.

18 Claims, 14 Drawing Sheets

<u>100b</u>

(58) Field of Classification Search
CPC .................. G03B 21/14; G09G 3/002; H04N
9/31–3197; H04N 21/4122; H04N
9/3144; H04N 9/314; H04N 9/3185;
H04N 9/3194; G06T 3/08
See application file for complete search history.

(56) References Cited

U.S. PATENT DOCUMENTS

| | | | |
|---|---|---|---|
| 8,994,714 | B2 | 3/2015 | Erinjippurath et al. |
| 11,089,277 | B2 | 8/2021 | Fukano et al. |
| 11,336,878 | B2 | 5/2022 | Yoon et al. |
| 2003/0223048 | A1* | 12/2003 | Kimura ................ H04N 9/3185 |
| | | | 353/70 |
| 2003/0223049 | A1 | 12/2003 | Ohara |
| 2007/0297066 | A1* | 12/2007 | Onishi ................... G09G 3/002 |
| | | | 359/726 |
| 2010/0165302 | A1 | 7/2010 | Ozawa |
| 2013/0107227 | A1* | 5/2013 | Tsuji .................... H04N 9/3185 |
| | | | 353/121 |
| 2015/0350615 | A1* | 12/2015 | Ono ..................... H04N 9/3194 |
| | | | 348/140 |
| 2020/0213568 | A1* | 7/2020 | Ozawa ................ H04N 9/3185 |
| 2021/0144349 | A1* | 5/2021 | Fukano ................ H04N 9/3194 |
| 2021/0185232 | A1 | 6/2021 | Sdobnikov |
| 2022/0201262 | A1 | 6/2022 | Chen |
| 2023/0196946 | A1* | 6/2023 | Ohira ..................... G03B 21/26 |
| | | | 353/28 |
| 2025/0039346 | A1* | 1/2025 | Suzuki ................. H04N 9/3194 |

FOREIGN PATENT DOCUMENTS

| | | | |
|---|---|---|---|
| JP | 2004-4284 | A | 1/2004 |
| JP | 3680807 | B2 | 8/2005 |
| JP | 2005-318355 | A | 11/2005 |
| JP | 2008-241490 | A | 10/2008 |
| JP | 2010-154168 | A | 7/2010 |
| JP | 4774826 | B2 | 9/2011 |
| JP | 2014-187530 | A | 10/2014 |
| JP | 2014-232167 | A | 12/2014 |
| KR | 10-2021-0123059 | A | 10/2021 |

OTHER PUBLICATIONS

DFrobot, "How to Use a Three-Axis Accelerometer for Tilt Sensing", Aug. 2018, 5 pages, url: https://wiki.dfrobot.com/How_to_Use_a_Three-Axis_Accelerometer_for_Tilt_Sensing.
Communications dated Oct. 27, 2023 issued by the Int. Searching Authority in App No. PCT/KR2023/011494 (PCT/ISA/210 & PCT/ISA/237).
Extended European Search Report issued Jun. 4, 2025 by the European Patent Office for EP Patent Application No. 23850491.4.

* cited by examiner

100a

410b (a)                          (b)

ELECTRONIC DEVICE AND OPERATION METHOD THEREOF

CROSS-REFERENCE TO RELATED APPLICATION(S)

This application is a continuation application, under 35 U.S.C. § 111(a), of international application No. PCT/KR2023/011494, filed on Aug. 4, 2023, which claims priority to Korean Patent Applications No. 10-2022-0098122, filed on Aug. 5, 2022, and No. 10-2022-0126590, filed on Oct. 4, 2022 in the Korean Intellectual Property Office, the disclosure of which is incorporated by reference herein in their entireties.

TECHNICAL FIELD

Various embodiments relate to an electronic device and an operation method thereof, and more particularly, to an electronic device for performing keystone correction, and an operation method of the electronic device.

BACKGROUND

With the development of optical technology, various types of projectors have been developed. A projector refers to an electronic device that projects light onto a screen, that is, a projection surface, to form an image on the projection surface. When the angle between the direction of the light projected from the projector and the projection surface is equal to a preset angle, a rectangular image is formed on the screen. However, when the angle between the direction of the light projected from the projector and the projection surface is not equal to the preset angle, warping occurs in the vertical and/or horizontal direction of the image, or a rotated image is formed on the projection surface. Such warping is referred to as 'keystone' or 'keystone effect'.

When a projection angle between the projection surface and the projector is not a right angle, the projector performs image processing to form a rectangular image on the projection surface by adjusting a projected screen to fit the shape of the screen. The projector may use a tilt sensor provided therein to obtain a rotation angle (e.g., a roll or a pitch) of the sensor with respect to the direction of gravity. In addition, the projector may use an image sensor such as a camera or a plurality of distance sensors provided therein to obtain a tilting angle (e.g., a yaw) between the projector and the projection surface. The projector may perform keystone correction by correcting the image by using the obtained angles.

SUMMARY

An electronic device according to an embodiment of the disclosure may include a sensing unit including a sensor, a memory storing one or more instructions, and one or more processors configured to execute the one or more instructions stored in the memory.

In an embodiment of the disclosure, the one or more processors may be configured to execute the one or more instructions to obtain, based on raw data obtained by using the sensor, a rotation angle of the electronic device.

In an embodiment of the disclosure, the one or more processors may be configured to identify, based on at least one of the raw data or the rotation angle, whether the sensor is stable.

DETAILED DESCRIPTION

Figure 1:
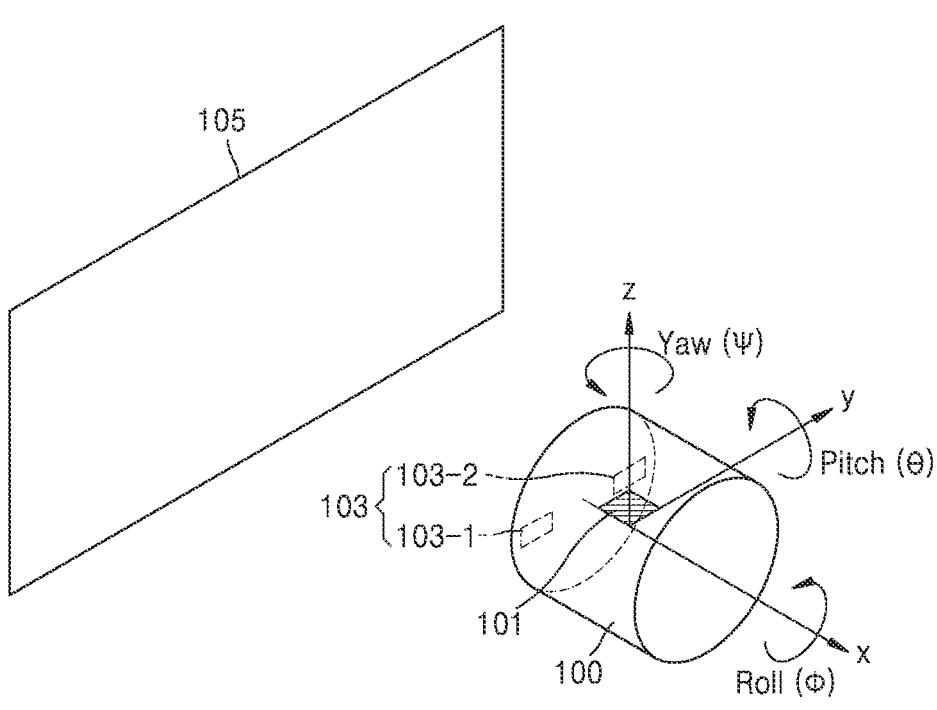
FIG. 1 is a diagram for describing an electronic device performing image processing for keystone correction by using a sensor, according to an embodiment of the disclosure.

In an embodiment of the disclosure, the one or more processors may be configured to, in response to identifying that the sensor is stable, identify whether the rotation angle is greater than or equal to a reference rotation angle.

In an embodiment of the disclosure, the one or more processors may be configured to, in response to the rotation angle being greater than or equal to the reference rotation angle, perform, based on the rotation angle, image processing for keystone correction.

An operation method of an electronic device according to an embodiment of the disclosure may include obtaining, based on raw data obtained by using a sensor, a rotation angle of the electronic device.

In an embodiment of the disclosure, the operation method of the electronic device may further include identifying, based on at least one of the raw data or the rotation angle, whether the sensor is stable.

In an embodiment of the disclosure, the operation method of the electronic device may further include, in response to identifying that the sensor is stable, identifying whether the rotation angle is greater than or equal to a reference rotation angle.

In an embodiment of the disclosure, the operation method of the electronic device may further include, in response to the rotation angle being greater than or equal to the reference rotation angle, performing, based on the rotation angle, image processing for keystone correction.

A recording medium according to an embodiment of the disclosure may be a computer-readable recording medium having recorded thereon a program for a computer to perform an operation method of an electronic device, the operation method including obtaining, based on raw data obtained by using a sensor, a rotation angle of the electronic device.

In an embodiment of the disclosure, the recording medium may be a computer-readable recording medium having recorded thereon a program for a computer to perform the operation method of the electronic device, the operation method further including identifying, based on at least one of the raw data or the rotation angle, whether the sensor is stable.

In an embodiment of the disclosure, the recording medium may be a computer-readable recording medium having recorded thereon a program for a computer to perform the operation method of the electronic device, the operation method further including, in response to identifying that the sensor is stable, identifying whether the rotation angle is greater than or equal to a reference rotation angle.

In an embodiment of the disclosure, the recording medium may be a computer-readable recording medium having recorded thereon a program for a computer to perform the operation method of the electronic device, the operation method further including, in response to the rotation angle being greater than or equal to the reference rotation angle, performing, based on the rotation angle, image processing for keystone correction.

The expression "at least one of a, b, or c" indicates only a, only b, only c, both a and b, both a and c, both b and c, all of a, b, and c, or variations thereof.

Hereinafter, embodiments are described in detail with reference to the accompanying drawings for those of skill in the art to be able to perform without any difficulty. The disclosed embodiments may, however, be embodied in many different forms and should not be construed as being limited to an embodiment set forth herein.

Although the terms used herein are generic terms, which are currently widely used and are selected by taking into consideration functions thereof, the meanings of the terms may vary according to intentions of those skilled in the art, legal precedents, or the advent of new technology. Thus, the terms should be defined not by simple appellations thereof but based on the meanings thereof and the context of descriptions.

In addition, terms used herein are for describing particular embodiments, and are not intended to limit the scope of the disclosed embodiments.

Throughout the specification, when a part is referred to as being "connected to" another part, it may be "directly connected to" the other part or be "electrically connected to" the other part through an intervening element.

The term "the" and other demonstratives similar thereto in the specification (especially in the following claims) should be understood to include a singular form and plural forms. In addition, when there is no description explicitly specifying an order of operations of a method, the operations may be performed in an appropriate order. The disclosed embodiments are not limited to the described order of the operations.

As used herein, phrases such as "in some embodiments" or "in an embodiment" does not necessarily indicate the same embodiment.

Some embodiments may be represented by block components and various process operations. Some or all of the functional blocks may be implemented by any number of hardware and/or software elements that perform particular functions. For example, the functional blocks may be embodied by at least one microprocessor or by circuit components for a certain function. In addition, for example, the functional blocks may be implemented by using various programming or scripting languages. The functional blocks may be implemented by using various algorithms executable by one or more processors. Furthermore, the disclosed embodiments may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

In addition, as used herein, the terms such as " . . . er (or)", " . . . unit", " . . . module", etc., denote a unit that performs at least one function or operation, which may be implemented as hardware or software or a combination thereof.

In addition, as used herein, the term "user" refers to a person who uses an electronic device, and may include a consumer, an evaluator, a viewer, an administrator, or an installer.

Hereinafter, the disclosed embodiments will be described in detail with reference to the accompanying drawings.

FIG. 1 is a diagram for describing an electronic device performing image processing for keystone correction by using a sensor, according to an embodiment of the disclosure.

Referring to FIG. 1, an electronic device 100 may be an electronic device capable of outputting an image. For example, the electronic device 100 may be a projector that projects an image onto a projection surface. Alternatively, the electronic device 100 may be a module that is included in a projector and performs image processing for keystone correction. Alternatively, the electronic device 100 may be implemented as various types of electronic devices that simultaneously perform a projector function and functions of other electronic devices. The electronic device 100 may be stationary or mobile.

The electronic device 100 may include a sensor. The sensor may obtain state information of the electronic device 100 and/or state information of a surrounding of the electronic device 100.

The electronic device 100 may obtain a rotation angle of the electronic device 100 by using the sensor. The rotation angle of the electronic device 100 may be defined based on the x-axis, y-axis, and z-axis of the electronic device 100 projecting an image toward a projection surface 105.

Referring to FIG. 1, when the projection angle between the electronic device 100 and the projection surface 105 is a right angle, the projection direction of light projected to the center of the projection surface 105 or the direction opposite thereto may be defined as the x-axis. In addition, the direction perpendicular to the x-axis and parallel to the horizontal direction of the projection surface 105 may be defined as the y-axis, and the direction perpendicular to the x-axis and parallel to the vertical direction of the projection surface 105 may be defined as the z-axis. An angle of rotation around the x-axis may be defined as a roll angle φ, an angle of rotation around the y-axis may be defined as a pitch angle θ, and an angle of rotation around the z-axis may be defined as a yaw angle ψ.

The electronic device 100 may include a position sensor. The electronic device 100 may sense the position, angle, etc. of the electronic device 100 based on the position sensor. The position sensor may include at least one of an acceleration sensor, a gravity sensor, an inertial sensor, or a geomagnetic sensor.

Hereinafter, for convenience of description, an example in which the position sensor included in the electronic device 100 is an acceleration sensor 101 will be described, but the disclosed embodiments are not limited thereto.

The electronic device 100 may include the acceleration sensor 101. The acceleration sensor 101 may sense a change in the velocity of the electronic device 100. The acceleration sensor 101 may be a two-axis acceleration sensor or a three-axis acceleration sensor. In a case in which the acceleration sensor 101 is a three-axis acceleration sensor, the acceleration sensor 101 may obtain raw data by measuring gravitational acceleration values for the x-axis, y-axis, and z-axis, respectively.

The electronic device 100 may obtain a rotation angle of the electronic device 100 with respect to the direction of gravity by using the raw data for each axis obtained by the acceleration sensor 101. The rotation angle of the electronic device 100 with respect to the direction of gravity may include at least one of a pitch angle or a roll angle of the electronic device 100 with respect to the direction of gravity.

The electronic device 100 may include a distance sensor 103. The electronic device 100 may include a plurality of distance sensors 103-1 and 103-2. The distance sensor 103 may be arranged in the left and right directions on the front of the electronic device 100 facing the projection surface 105, and may be used to obtain the distance from the electronic device 100 to the projection surface 105 and a tilting degree between the electronic device 100 and the projection surface 105.

The electronic device 100 may obtain raw data through the distance sensor 103 and calculates a yaw angle, which is a rotation angle of the electronic device 100 with respect to the projection surface 105, based on the raw data.

The electronic device 100 may additionally perform a filtering operation (e.g., a low-pass filter or a moving average) to remove noise from sensing values obtained through the acceleration sensor 101 and the distance sensor 103.

After removing the noise from the sensing values, the electronic device 100 may calculate a rotation angle based on the sensing value from which the noise is removed.

The electronic device 100 may obtain a geometric relationship between the projection surface 105 and the electronic device 100 by using the rotation angle, and perform keystone correction based on the geometric relationship.

As such, because the electronic device 100 obtains the rotation angle of the electronic device 100 based on the raw data obtained by using the sensor, the accuracy of the sensor directly affects the accuracy of calculating the rotation angle. In addition, because the electronic device 100 performs the keystone correction based on the rotation angle, the keystone correction is accurately performed only when the values of the respective axes of the sensor are stable and accurate.

A projector includes a light source for projecting an image, due to the nature of the product. For example, the projector may include a light source such as a lamp, a light-emitting diode (LED), or laser. The internal temperature of the projector is greater than that of other electronic devices due to heat generated by, for example, a lamp, and/or an LED light source included in the projector. A cooling structure such as a heat sink or a fan may be included inside the projector to lower the internal temperature, however, as the size of projectors is gradually reduced and the integration density of boards increases, there is a limit to lowering the internal temperature even when a cooling structure is included inside the projector.

When the heat of the light source increases, the temperature of a printed circuit board (PCB), which is a board inside the projector, also increases. The PCB is a thin board on which electrical components such as integrated circuits, resistors, and sensors are arranged, and deformation such as distortion may occur due to the influence of temperature.

When the PCB is deformed, a sensor mounted on the PCB also receives a deforming force, and thus, there is a possibility of incorrectly sensing raw data. That is, when the PCB inside the projector is deformed and thus tilted even though the projector is not tilted, there is a possibility of incorrectly obtaining raw data because the acceleration sensor mounted on the PCB senses the deforming force. In a case in which a roll angle or a pitch angle, which is a rotation angle of each axis, is obtained based on incorrect raw data obtained by the acceleration sensor, keystone correction based on the roll angle or pitch angle is also inaccurate.

In addition, when the PCB is deformed, there is a possibility that the distance sensor mounted on the PCB incorrectly senses the distance between the projector and the projection surface due to a misaligned position or angle. In a case in which the distance sensor obtains incorrect raw data and an image is corrected according to a yaw angle obtained based on the incorrect raw data, there is a possibility that keystone correction according thereto may also be incorrectly performed.

Thus, the electronic device 100 may find a section or a time point in which the raw data obtained by the sensor or the rotation angle obtained based on the raw data is not significantly affected by the temperature.

In the section in which the raw data obtained by the sensor or the rotation angle is not significantly affected by the temperature, the raw data or the rotation angle based on the raw data has a small data variation range. Therefore, a state in which a difference value in raw data or rotation angles for a preset time period is less than or equal to a threshold value may be defined as a state in which the sensor is stable. The electronic device 100 may identify whether the sensor is stable, based on a difference in sensor values for a preset time period or a difference in rotation angles for a preset time period.

In addition, keystone correction may be performed based on a rotation angle obtained after determining that the sensor is stable. Therefore, it is possible to eliminate the possibility of incorrectly performing keystone correction based on a rotation angle obtained while the sensor is affected by temperature.

When the electronic device 100 is powered on and is booted, the light source included in the electronic device 100 generates heat. Hereinafter, for convenience of description, an example in which the light source included in the electronic device 100 is an LED light source will be described, but the disclosed embodiments are not limited thereto.

Due to the heat generated by the LED light source included in the electronic device 100, the internal temperature of the electronic device 100 continuously increases until it reaches a certain temperature. After the internal temperature of the electronic device 100 reaches the certain temperature, the temperature does not increase any more to be at a constant temperature, or tends to change with a gentle slope.

The raw data obtained by the sensor mounted on the PCB and the rotation angle obtained based on the raw data may be affected by a change in the internal temperature of the electronic device 100. For example, when the internal temperature of the electronic device 100 significantly changes, for example, when the internal temperature rapidly increases, the rotation angle also tends to significantly change. In addition, when the internal temperature of the electronic device 100 has already reached a certain temperature and changes by a small amount, the rotation angle also tends to change by a small amount. For example, while the internal temperature of the electronic device 100 increases to 70° C., the rotation angle tends to change by a large amount for a certain time period, whereas, after the internal temperature exceeds 70° C., the rotation angle tends to change by a small amount for a certain time period.

The electronic device 100 may determine whether the sensor is stable, by using at least one of a change in the raw data obtained by the sensor, or a change in the rotation angle obtained based on the raw data.

The electronic device 100 may identify whether the sensor is stable, based on the difference between a value at a time point t and a value at a time point t–k in at least one of the raw data or the rotation angle.

The electronic device 100 may identify whether the sensor is stable, by identifying whether a difference value between the value at the time point t and the value at the time point t–k in at least one of the raw data or the rotation angle is less than or equal to a threshold value.

When the number of times that the difference value is less than or equal to the threshold value is greater than or equal to a preset number of times, the electronic device 100 may determine that the sensor is stable. For example, when the number of times that a difference value between a pitch angle at the time point t and a pitch angle at the time point t–k is less than or equal to the threshold is N (N is a natural number greater than or equal to 2), the electronic device 100 may identify that the acceleration sensor 101 is stable.

In response to identifying that the sensor is stable, the electronic device 100 may identify whether the rotation angle is greater than or equal to a reference rotation angle.

In response to the rotation angle being greater than or equal to the reference rotation angle, the electronic device 100 may perform image processing for keystone correction based on the rotation angle. In more detail, the electronic device 100 may perform the image processing for keystone correction based on a rotation angle having a value greater than or equal to the reference rotation angle, among a pitch angle, a roll angle, and a yaw angle.

The electronic device 100 may identify whether the sensor is stable, only within a threshold time period after the electronic device 100 is powered on and booted. After the electronic device 100 is booted, the light source starts generating heat and the internal temperature increases until a certain time point or up to a certain temperature. Because the value of the raw data obtained by the sensor changes by a large amount while the temperature of the electronic device 100 increases, the electronic device 100 may determine whether the sensor is stable only during a preset time period during which the booting starts and the temperature of the electronic device 100 increases.

When it is not identified, within a threshold time period after the booting, that the acceleration sensor 101 is stable, and the threshold time period elapses, the electronic device 100 may determine whether the rotation angle is greater than or equal to the reference rotation angle. That is, in a case in which the sensor is not stable even within the threshold time period, the electronic device 100 may, rather than continuously determining whether the sensor is stable, compare the rotation angle with the reference rotation angle, and when the rotation angle is greater than the reference rotation angle, perform keystone correction according to the rotation angle.

Before obtaining the rotation angle, the electronic device 100 may first identify whether the electronic device 100 is moving.

When the electronic device 100 is moving, such as when a user is moving the electronic device 100 to adjust the projection direction or when the electronic device 100 is automatically adjusting the projection direction to a preset direction, a physical force for moving the electronic device 100 acts on each axis of the acceleration sensor 101 in addition to the effect of gravitational acceleration. Thus, while the electronic device 100 is moved by the physical force, the sensor senses the physical force in addition to the gravitational acceleration. On the other hand, because the acceleration sensor 101 senses only the gravitational acceleration when the electronic device 100 is not moving, it is possible to accurately determine how much the electronic device 100 is inclined with respect to the direction of gravity, only by using a sensing value obtained when the electronic device 100 is not moving.

In addition, when the electronic device 100 is moving, the distance and angle between the distance sensor 103 and the projection surface 105 change, and thus, a value sensed by the distance sensor 103 is highly likely to be inaccurate.

Accordingly, The electronic device 100 may first determine whether the electronic device 100 is stationary, that is, not moving. When it is determined that the electronic device 100 is not moving, the electronic device 100 may obtain a rotation angle based on raw data.

The electronic device 100 may determine a motion of the electronic device 100 by using a sensing value obtained through at least one of the acceleration sensor 101 or the distance sensors 103-1 and 103-2. In detail, the electronic device 100 may collect sensing values of a plurality of samples obtained through the acceleration sensor 101 and the distance sensor 103, and determine whether the electronic device 100 is moving, by using the mean, variance, standard deviation, etc. of the sensing values.

The electronic device 100 may further include a temperature sensor configured to detect a temperature change by the LED light source.

The electronic device 100 may sense the internal temperature of the electronic device 100 by using the temperature sensor, and determine a reference rotation angle based on the temperature.

As described above, the rotation angle is affected by the internal temperature of the electronic device 100. Accordingly, the electronic device 100 may set the reference rotation angle differently for a case in which the internal temperature is greater than a reference temperature and a case in which the internal temperature is less than or equal to the reference temperature, considering the relationship between the internal temperature and the rotation angle.

The reference rotation angle may refer to a rotation angle to be used as a reference in determining whether to identify a rotation angle obtained by sensing with a sensor as meaningful data.

The electronic device 100 may identify whether a temperature sensed by the temperature sensor is greater than the reference temperature. The reference temperature may be a temperature to be used as a reference for distinguishing between a section in which the rotation angle changes by a large amount according to a change in the temperature of the electronic device 100, and a section in which the rotation angle changes by a small amount according to a change in the temperature of the electronic device 100. For example, in a case in which the rotation angle changes by a large amount while the internal temperature of the electronic device 100 increases to 70° C., and the rotation angle changes by a small amount when the internal temperature of the electronic device 100 is greater than 70° C., the reference temperature may be 70° C.

The electronic device 100 may set the reference rotation angle differently for a case in which the current temperature sensed by the temperature sensor is greater than the reference temperature of 70° C., and a case in which the current temperature sensed by the temperature sensor is less than the reference temperature of 70° C.

The electronic device 100 may set the reference rotation angle to an angle th1, based on the current temperature being less than or equal to the reference temperature, and set the reference rotation angle to an angle th2, based on the current temperature being greater than the reference temperature. The angle th1 may be greater than the angle th2. That is, when the current temperature of the electronic device 100 is greater than the reference temperature, the electronic device 100 may set the reference rotation angle to a small angle, thus determine even a small rotation angle as meaningful data, and perform keystone correction according to the rotation angle.

In addition, in a case in which the current temperature is less than or equal to the reference temperature, the rotation angle is predicted to continuously change, the electronic device 100 may set the reference rotation angle to a slightly large angle, thus determine only a large rotation angle as meaningful data, and perform keystone correction according to the rotation angle.

The electronic device 100 may determine only a rotation angle greater than the reference rotation angle as meaningful data, and may set a rotation angle less than the reference rotation angle to 0, and thus not determine the rotation angle less than the reference rotation angle as meaningful data.

As such, in order to minimize an error in the rotation angle due to a change in the internal temperature, the electronic device 100 may identify a change in at least one of the raw data or the rotation angle, and determine, based on the change, whether the sensor is stable. Accordingly, the electronic device 100 may perform keystone correction by using only a rotation angle obtained in a section in which the sensor is stable.

In addition, the electronic device 100 may include a temperature sensor to measure the internal temperature of the electronic device 100, and may adjust the reference rotation angle differently depending on whether the temperature of the electronic device 100 is greater than the reference temperature. Therefore, the electronic device 100 may determine whether to determine a rotation angle as meaningful data, depending on whether the current temperature of the electronic device 100 is less than or equal to the reference temperature, thereby minimizing the influence of the temperature on the rotation angle.

Figure 2:
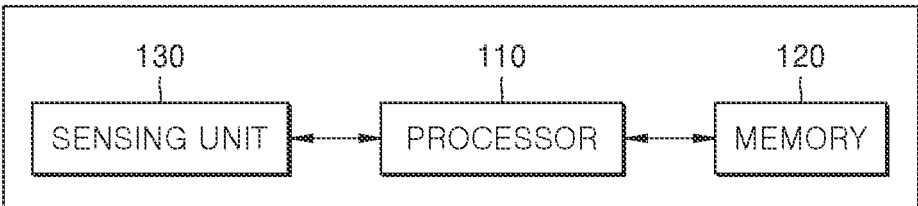
FIG. 2 is an internal block diagram of an electronic device according to an embodiment of the disclosure.

FIG. 2 is an internal block diagram of an electronic device according to an embodiment of the disclosure.

An electronic device 100a of FIG. 2 may be an example of the electronic device 100 of FIG. 1.

Referring to FIG. 2, the electronic device 100a may include a processor 110, a memory 120, and a sensing unit 130.

The sensing unit 130 may include a sensor. The sensor may obtain raw data by detecting a state of the electronic device 100a or a state of a surrounding of the electronic device 100a, and transmit the raw data to the processor 110.

The sensing unit 130 may include a temperature sensor. The sensing unit 130 may measure the internal temperature of the electronic device 100a by using the temperature sensor, and transmit the internal temperature to the processor 110.

The sensing unit 130 may include a sensor configured to obtain raw data for estimating the posture of the electronic device 100a. The processor 110 may estimate the posture of the electronic device 100a, based on the raw data obtained through the sensing unit 130. The processor 110 may estimate the posture of the electronic device 100a by using a roll angle, a pitch angle, and a yaw angle, which are rotation angles with respect to three axes, that is, the x-axis, the y-axis, and the z-axis, respectively.

The memory 120 may store at least one instruction.

The memory 120 may store at least one program executable by the processor 110. Also, the memory 120 may store data input to or output from the electronic device 100a.

The memory 120 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EE-PROM), programmable ROM (PROM), magnetic memory, a magnetic disk, or an optical disc.

The memory 120 may store one or more instructions for obtaining a rotation angle based on raw data obtained by the sensor.

The memory 120 may store one or more instructions for removing noise included in raw data.

The memory 120 may store one or more instructions for identifying whether the sensor is stable, based on at least one of raw data or a rotation angle.

The memory 120 may store one or more instructions for identifying whether a rotation angle is greater than or equal to a reference rotation angle.

The memory 120 may store one or more instructions for identifying whether the electronic device 100a is moving, based on raw data.

The memory 120 may store a reference temperature to be used as a reference for determining whether the internal temperature of the electronic device 100a is greater than or equal to a threshold value.

The memory 120 may store one or more instructions for determining a reference rotation angle according to the temperature of the electronic device 100a.

The memory 120 may store one or more instructions for performing image processing for keystone correction based on a rotation angle when a rotation angle is greater than or equal to a reference rotation angle.

The memory 120 may store one or more instructions for setting a rotation angle to 0 when the rotation angle is less than a reference rotation angle.

The memory 120 may store one or more instructions for identifying whether the sensor is stable within a threshold time period after a time point at which the electronic device is powered on and booted.

The memory 120 may store one or more instructions for determining, based on not identifying that the sensor is stable within a threshold time period, whether a rotation angle after a threshold time period has elapsed is greater than or equal to a reference rotation angle.

The electronic device 100a may include one or more processors 110. The processor 110 may control the overall operation of the electronic device 100a.

The one or more processors 110 may execute one or more instructions stored in the memory 120 to control the electronic device 100a to function.

The one or more processors 110 may execute one or more instructions to, based on raw data obtained by the sensor, obtain a rotation angle of the electronic device 100a.

The one or more processors 110 may execute one or more instructions to perform signal processing for removing noise from raw data.

The one or more processors 110 may execute one or more instructions to identify a motion of the electronic device 100a based on the raw data.

The one or more processors 110 may execute one or more instructions to, in response to identifying that the electronic device 100a is not moving, obtain a rotation angle from raw data.

The one or more processors 110 may execute one or more instructions to, based on at least one of raw data or a rotation angle obtained based on the raw data, identify whether the sensor is stable.

The one or more processors 110 may execute one or more instructions to, based on raw data obtained by the sensor included in the sensing unit 130, obtain a rotation angle of the electronic device 100a with respect to the direction of gravity.

A rotation angle of the electronic device 100a with respect to the direction of gravity may include at least one of a pitch angle or a roll angle of the electronic device 100a with respect to the direction of gravity.

The one or more processors 110 may execute one or more instructions to, based on raw data obtained by the sensor included in the sensing unit 130, obtain a rotation angle of the electronic device 100a with respect to the projection surface 105.

A rotation angle of the electronic device 100a with respect to the projection surface 105 may include a yaw angle.

The one or more processors 110 may execute one or more instructions to, based on a difference value between a value at the time point t and a value at a time point t–k in at least one of raw data or rotation angles, identify whether the sensor is stable.

The one or more processors 110 may execute one or more instructions to identify whether the sensor is stable, by identifying whether a difference value between a value at the time point t and a value at the time point t–k in at least one of raw data or rotation angles is less than or equal to a threshold value.

The one or more processors 110 may execute one or more instructions to, in response to identifying that the sensor is stable, identify whether a rotation angle is greater than or equal to a reference rotation angle.

The one or more processors 110 may execute one or more instructions to determine a reference rotation angle according to a temperature value obtained by the temperature sensor included in the sensing unit 130.

The one or more processors 110 may execute one or more instructions to identify whether a temperature obtained by the temperature sensor is greater than a reference temperature, based on the temperature being less than or equal to the reference temperature, set a reference rotation angle to the angle th1, and based on the temperature being greater than the reference temperature, set the reference rotation angle to the angle th2. The angle th1 may be greater than the angle th2.

The one or more processors 110 may execute one or more instructions to, in response to a rotation angle being greater than or equal to a reference rotation angle, perform image processing for keystone correction based on the rotation angle.

The one or more processors 110 may execute one or more instructions to, to a rotation angle being less than a reference rotation angle, set the rotation angle to 0.

A rotation angle may include at least one of a pitch angle, a roll angle, or a yaw angle.

The one or more processors 110 may execute one or more instructions to correct an image projected onto the projection surface 105, by using a rotation angle having a value greater than or equal to a reference rotation angle, among a pitch angle, a roll angle, and a yaw angle.

The one or more processors 110 may execute one or more instructions to identify whether the sensor is stable within a threshold time period after the electronic device 100a is powered on (booted).

The one or more processors 110 may execute one or more instructions to, based on identifying that the sensor is not stable within a threshold time period, determine whether a rotation angle after the threshold time period elapses is greater than or equal to a reference rotation angle.

Figure 3:
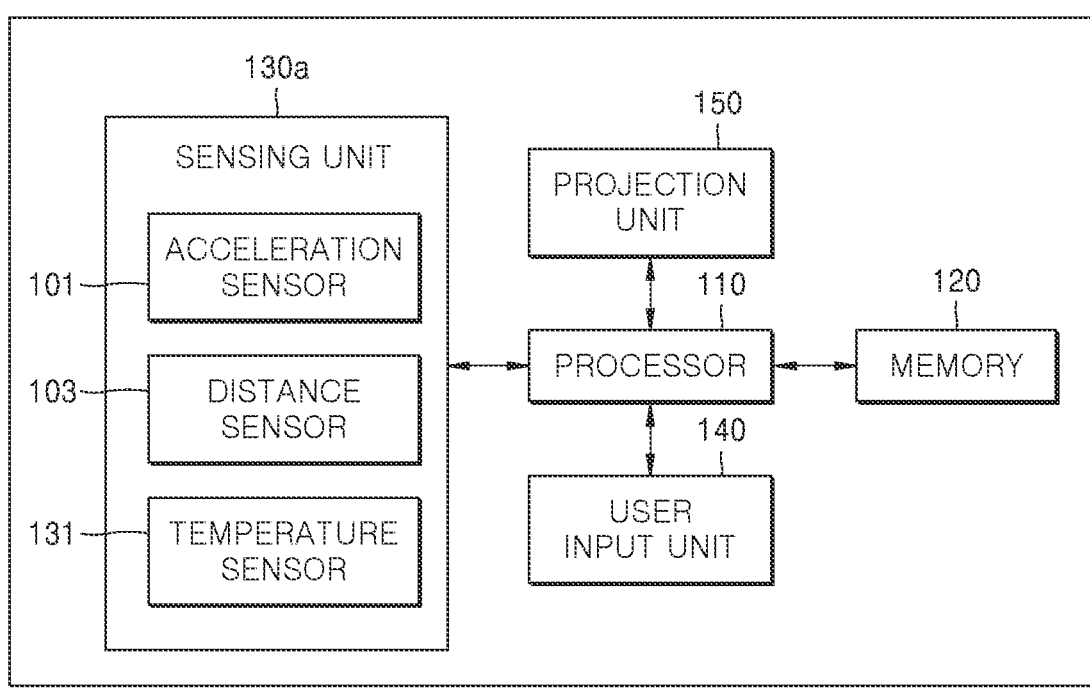
FIG. 3 is an internal block diagram of an electronic device according to an embodiment of the disclosure.

FIG. 3 is an internal block diagram of an electronic device according to an embodiment of the disclosure.

An electronic device 100b of FIG. 3 may be an example of the electronic device 100a of FIG. 2. Hereinafter, descriptions that are provided above with reference to FIG. 2 will be omitted.

Referring to FIG. 3, the electronic device 100b may include the processor 110, the memory 120, a sensing unit 130a, a user input unit 140, and a projection unit 150.

The sensing unit 130a may include a plurality of sensors.

The sensing unit 130a may include the acceleration sensor 101, the distance sensor 103, and a temperature sensor 131.

The acceleration sensor 101 may obtain three-axis acceleration values of the electronic device 100b as raw data, and transmit the raw data regarding the acceleration values to the processor 110. Based on the raw data regarding the three-axis acceleration values, the processor 110 may obtain a roll angle and a pitch angle, which are rotation angles of the electronic device 100b with respect to the direction of gravity.

Because the acceleration sensor 101 is a sensor configured to sense a change in acceleration, and the acceleration is affected by a force, when a PCB inside the electronic device 100b receives a distorting force due to temperature and thus is deformed, the acceleration sensor 101 mounted on the PCB senses the force by which the PCB is distorted.

The electronic device 100b may determine whether the acceleration sensor 101 is stable, in order to identify whether the raw data sensed by the acceleration sensor 101 is reliable.

The processor 110 may determine whether the acceleration sensor 101 is stable, by using at least one of the raw data obtained by the acceleration sensor 101 or a rotation angle obtained based on the raw data. The processor 110 may determine whether the acceleration sensor 101 is stable, by using at least one of a roll angle or a pitch angle, which is a rotation angle.

The sensing unit 130a may include the distance sensor 103. A plurality of distance sensors 103 may be provided. The plurality of distance sensors 103 may be arranged in the horizontal direction on the front surface of the electronic device 100b facing the projection surface 105. For example, the electronic device 100b may include two distance sensors 103 arranged side by side along the y-axis, which is parallel to the projection surface 105. Alternatively, the two distance sensors 103 may be rotated by a first angle to face each other with a certain angle. For example, the two distance sensors 103 may be symmetrically rotated by the first angle to face each other with respect to the z-axis.

However, this is only an embodiment, and the arrangement or positions of the plurality of distance sensors 103 may be variously modified according to the exterior or structure of the electronic device 100b.

The number of distance sensors 103 may be two, but is not limited thereto, and two or more distance sensors, for example, four or six distance sensors may be arranged in the electronic device 100b.

The distance sensor 103 may be implemented in various types such as an infrared sensor, a light detection and ranging (LIDAR) sensor, a radio detection and ranging (RADAR) sensor, a photodiode sensor, a depth sensor, an ultrasonic sensor, etc.

Two or more distance sensors 103 may be arranged at positions facing the projection surface 105 to obtain raw data regarding the distance to the projection surface 105. Based on raw data obtained by sensing by the distance sensor 103, the processor 110 may obtain a yaw angle, which is a rotation angle of the electronic device 100b with respect to the projection surface 105.

Because the distance sensor 103 is also mounted on the PCB, when the PCB is deformed by temperature, the position or angle of the distance sensor 103 may change and the distance to the projection surface 105 may be incorrectly sensed.

The processor 110 may determine whether the distance sensor 103 is stable, by using at least one of raw data obtained by the distance sensor 103 or a rotation angle obtained based on the raw data.

The processor 110 may identify, based on at least one of the acceleration sensor 101 or the distance sensor 103, whether the sensor is in a stability section or a stability time point at which the sensor is not significantly affected by temperature, and perform keystone correction based on a rotation angle obtained when the sensor is stable.

Although FIG. 3 illustrates the sensing unit 130a includes the distance sensor 103, the disclosed embodiments are not limited thereto, and the sensing unit 130a may obtain the distance between the electronic device 100b and the projection surface 105 as raw data by using an image sensor such as a camera instead of the distance sensor 103. Alternatively, the sensing unit 130a may sense the distance to the projection surface 105 by using, for example, a depth camera, an infrared sensor.

The sensing unit 130a may include the temperature sensor 131. The temperature sensor 131 may measure the internal temperature of the electronic device 100b. The processor 110 may compare the internal temperature of the electronic device 100b obtained through the temperature sensor 131 with the reference temperature stored in the memory 120 to determine whether the internal temperature of the electronic device 100b is greater than or equal to the reference temperature.

The processor 110 may set the reference rotation angle differently for a case in which the internal temperature of the electronic device 100b is less than the reference temperature, and a case in which the temperature is greater than or equal to the reference temperature.

The reference rotation angle may be an angle to be used as a reference for determining whether a rotation angle obtained by using the acceleration sensor 101 and the distance sensor 103 is meaningful data to be used for keystone correction.

The user input unit 140 may refer to a unit for the user to input data for controlling the electronic device 100b. The user may input a control signal for controlling the electronic device 100b, through the user input unit 140.

The user input unit 140 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, and/or a jog switch.

In addition, the user input unit 140 may include a microphone, a camera unit, and an optical receiver capable of detecting a user's voice, image, or interaction. The microphone may receive the user's uttered voice, convert the received voice into an electrical signal, and transmit the electrical signal to the processor 110. The camera unit may include a lens and capture an image formed on a screen. The optical receiver may receive an optical signal such as a control signal. The optical receiver may receive an optical signal corresponding to a user input (e.g., a touch, a push, a touch gesture, a voice, or a motion) from a remote control device such as a remote controller or a mobile phone. The processor 110 may extract a control signal from the received optical signal.

The projection unit 150 is a component that projects light for displaying an image to the outside, and may also be referred to as a projection unit. The projection unit 150 may include various detailed components such as a light source, a projection lens, or a reflector.

The projection unit 150 may project an image by using various projection methods (e.g., a cathode-ray tube (CRT) method, a liquid-crystal display (LCD) method, a digital light processing (DLP) method, a laser method, etc.).

The projection unit 150 may include various types of light sources. For example, the projection unit 150 may include at least one light source among a lamp, an LED, and laser.

The projection unit 150 may output an image in a 4:3 aspect ratio, a 5:4 aspect ratio, a wide 16:9 aspect ratio according to a purpose of the electronic device 100b or the user's settings, and may output an image in various resolutions such as WVGA (854*480), SVGA (800*600), XGA (1024*768), WXGA (1180*720), WXGA (1180*800), SXGA (1180*1024), UXGA (1600*1100), and/or Full HD (1920*1080).

The projection unit 150 may perform various functions for adjusting an output image under control by the processor 110. For example, the projection unit 150 may perform functions such as zoom, keystone, or lens shift.

The projection unit 150 may perform, for example, a zoom function, a keystone correction function, and/or a focus adjustment function by automatically analyzing a surrounding environment and a projection environment according to or without control by the user. The projection unit 150 may automatically perform, for example, the zoom function, the keystone function, and/or the adjustment function, based on the distance between the electronic device 100b and the projection surface 105 that is sensed through, for example, the distance sensor 103, a camera, a depth camera, and/or an infrared sensor, information about a space in which the electronic device 100b is currently located, information about, for example, the amount of ambient light.

Figure 4:
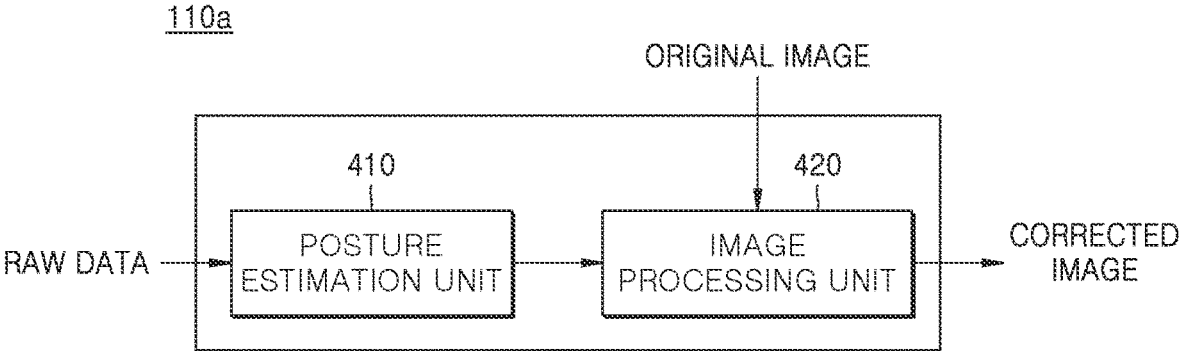
FIG. 4 is an internal block diagram of a processor included in an electronic device according to an embodiment of the disclosure.

FIG. 4 is an internal block diagram of a processor included in an electronic device according to an embodiment of the disclosure.

A processor 110a of FIG. 4 may be an example of the processor 110 of FIG. 3.

Referring to FIG. 4, the processor 110a may include a posture estimation unit 410 and an image processing unit 420.

The posture estimation unit 410 may receive raw data from the sensing unit 130a. The posture estimation unit 410 may estimate the posture of the electronic device 100b based on the raw data.

The posture estimation unit 410 may first remove noise from the raw data before estimating the posture of the electronic device 100b. For example, the posture estimation unit 410 may remove the noise included in the raw data by using a low-pass filter or a moving average to remove the noise included in the raw data.

The posture estimation unit 410 may perform signal processing for noise removal by using the raw data received from the sensing unit 130a for a preset time period. Alternatively, the posture estimation unit 410 may simultaneously receive the raw data from the sensing unit 130a and remove the noise in real time.

The posture estimation unit 410 may estimate the posture of the electronic device 100b based on the noise-removed raw data. However, this is only an embodiment, and the posture estimation unit 410 may directly estimate the posture of the electronic device 100b based on the raw data without noise removal.

The posture of the electronic device 100b may be estimated through a roll angle, a pitch angle, and a yaw angle, which are rotation angles of the electronic device 100b.

The posture estimation unit 410 may estimate a roll angle and a pitch angle based on raw data received from the acceleration sensor 101.

The posture estimation unit 410 may estimate a yaw angle based on raw data received from the distance sensor 103.

The posture estimation unit 410 may identify whether the acceleration sensor 101 or the distance sensor 103 included in the sensing unit 130a is stable, based on at least one of raw data or a rotation angle.

When it is identified that the acceleration sensor 101 is stable, the posture estimation unit 410 may transmit at least one of the roll angle or the pitch angle to the image processing unit 420. Also, when it is identified that the distance sensor 103 is stable, the posture estimation unit 410 may transmit the yaw angle to the image processing unit 420.

The image processing unit 420 may correct an original image based on the estimated posture of the electronic device 100b.

The image processing unit 420 may obtain a projection matrix and a transformation matrix by using a pitch angle and a yaw angle, which are rotation angles of the electronic device 100b, and the shortest distance between the electronic device 100b and the projection surface 105.

The image processing unit 420 may perform image processing for keystone correction on an original image, based on the projection matrix and the transformation matrix.

Figure 5:
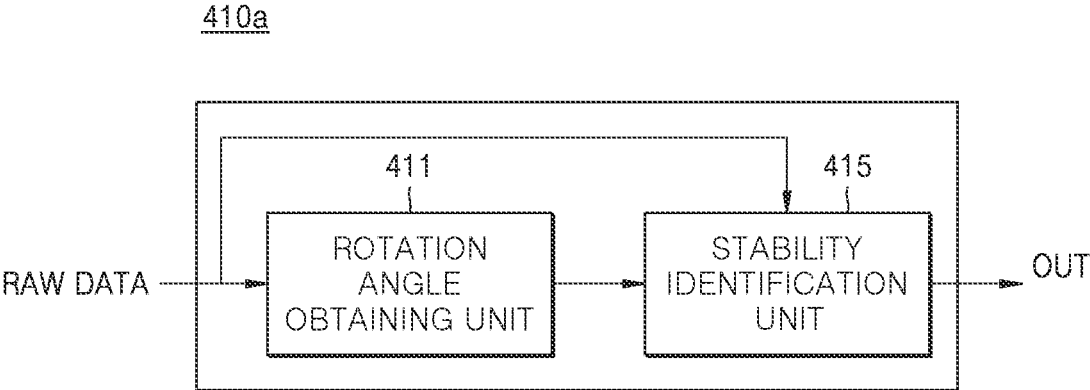
FIG. 5 is a diagram illustrating an example of a posture estimation unit of FIG. 4.

FIG. 5 is a diagram illustrating an example of the posture estimation unit of FIG. 4.

Referring to FIG. 5, a posture estimation unit 410a may include a rotation angle obtaining unit 411 and a stability identification unit 415.

The rotation angle obtaining unit 411 may receive raw data from the acceleration sensor 101. The rotation angle obtaining unit 411 may receive x-, y-, and z-axis acceleration values as raw data from the acceleration sensor 101.

The rotation angle obtaining unit 411 may estimate a roll angle and a pitch angle based on the raw data received from the acceleration sensor 101.

When the electronic device 100b including the acceleration sensor 101 is not moving, only the effect of gravitational acceleration is measured from each axis of the acceleration sensor 101. By using a sensing value obtained when the electronic device 100b is not moving, it is possible to identify how much the electronic device 100b including the acceleration sensor 101 is inclined with respect to the direction of gravity.

The rotation angle obtaining unit 411 may calculate a roll angle $\varphi$ and a pitch angle $\theta$ based on the raw data by using Equations 1 and 2 below.

$$\phi = \tan^{-1}\left(\frac{A_{by}}{A_{bz}}\right) \qquad \text{[Equation 1]}$$

$$\theta = \tan^{-1}\left(\frac{A_{bx}}{\sqrt{A_{by}^2 + A_{bz}^2}}\right) \qquad \text{[Equation 2]}$$

In Equation 1, $A_{bx}$, $A_{by}$, and $A_{bz}$ x-, y-, and z-axis acceleration values of the acceleration sensor 101, respectively.

The rotation angle obtaining unit 411 may obtain a yaw angle based on raw data obtained from the distance sensor 103. The rotation angle obtaining unit 411 calculates the distance between each of a plurality of distance sensors 103, for example, two distance sensors 103, and the projection surface 105 by using sensing values received from each of the two distance sensors 103, and calculate a yaw angle by using the distance between each of the two distance sensors 103 and the projection surface 105, the distance between the two distance sensors 103, and a rotation angle between the two distance sensors 103.

The rotation angle obtaining unit 411 may obtain at least one of a roll angle, a pitch angle, or a yaw angle, and transmit the obtained angle(s) to the stability identification unit 415.

The stability identification unit 415 may identify whether the sensor is stable.

Because the temperature of the projector is high due to heat generated by the light source included therein, there is a possibility that the sensor senses an incorrect value due to deformation of a board on which the sensor is mounted. Accordingly, the stability identification unit 415 may determine whether the sensor is stable, in order to identify whether the sensor has sensed an incorrect value.

The stability identification unit 415 may identify whether the sensor is stable, based on raw data. The stability identification unit 415 may receive raw data from at least one of the acceleration sensor 101 and or distance sensor 103, and identify whether the sensor is stable, based on the raw data. The stability identification unit 415 may identify whether the sensor is stable, based on a change in the raw data.

Alternatively, the stability identification unit 415 may identify whether the sensor is stable, based on a rotation angle obtained based on the raw data. The stability identification unit 415 may obtain, from the rotation angle obtaining unit 411, at least one of a roll angle, a pitch angle, or a yaw angle, which is a rotation angle, and determine whether the sensor is stable, based on the obtained angle(s).

The stability identification unit 415 may identify whether the sensor is stable, based on a change in the rotation angle. The stability identification unit 415 may identify, as a stability section, a section in which the rotation angle changes by a small amount even when the internal temperature of the electronic device 100*b* changes. The stability identification unit 415 may identify whether the sensor is stable, by using a change in the rotation angle.

For example, the stability identification unit 415 may identify whether the acceleration sensor 101 is stable, by using the roll angle. The stability identification unit 415 may identify whether the sensor is stable, by identifying whether the difference between the roll angle at the time point t and the roll angle at the time point t–k is less than or equal to a threshold value.

The stability identification unit 415 may identify that the sensor is stable, when the number of times that the difference between the roll angle at the time point t and the roll angle at the time point t–k is less than or equal to the threshold value is N (N is a natural number greater than or equal to 2).

Hereinafter, a change in a rotation angle and whether a sensor is stable will be described with reference to FIGS. 6 and 7.

Figure 6:
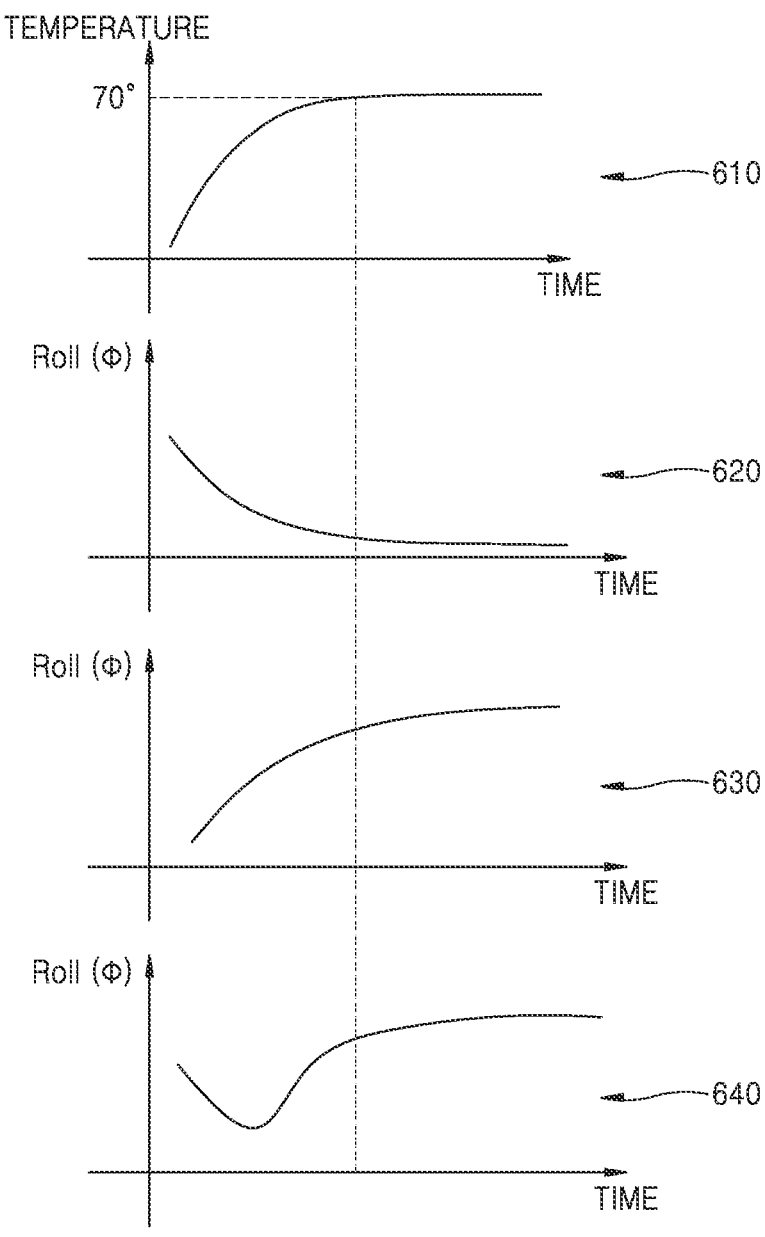
FIG. 6 is a diagram for describing that a rotation angle changes according to the internal temperature of an electronic device, according to an embodiment of the disclosure.

FIG. 6 is a diagram for describing that a rotation angle changes according to the internal temperature of an electronic device, according to an embodiment of the disclosure.

A projector includes a light source to project an image. Because a clear image is projected only when the projector projects an image with strong light, the light source such as a lamp or an LED generates a large amount of heat, and the internal temperature of the projector increases accordingly. When the temperature of the projector increases and thus a board therein is deformed, for example, distorted, there is a possibility that a sensor arranged on the board senses the force applied to the board and thus obtain incorrect raw data, even though the projector is not rotating. In a case in which a roll angle or a pitch angle, which is a rotation angle, is obtained based on the incorrect raw data obtained by the sensor, keystone correction based on the roll angle or pitch angle is also inaccurate.

Referring to FIG. 6, the reference numeral '610' is a graph showing that the internal temperature of the electronic device 100*b* changes due to heat generated by the LED light source included in the electronic device 100*b*.

As shown in the graph 610, the internal temperature of the electronic device 100*b* shows a tendency to continuously increase due to heating of the light source until it reaches a certain temperature, and after reaching the certain temperature, stop increasing and maintain a constant temperature or slightly change with a gentle slope.

Reference numerals '620' to '640' are A graphs each showing a roll angle φ obtained based on raw data obtained by using the acceleration sensor 101 included in the electronic device 100*b* when the internal temperature of the electronic device 100*b* changes as shown in the graph 610.

When the internal temperature of the electronic device 100*b* changes, the raw data changes in various forms. For example, as shown in the graph 620 or 630, the roll angle may increase or decrease over time. Alternatively, as shown in the graph 640, the roll angle may decrease as the temperature increases and then increase, rather than simply increasing or decreasing. That is, when the internal temperature of the electronic device 100*b* increases, the raw data changes in various forms.

Referring to the graphs 610 to 640, it may be seen that the roll angle changes differently between before and after the temperature of the electronic device 100*b* reaches a certain temperature, for example, before and after the temperature of the electronic device 100*b* is 70° C. That is, it may be seen that, until the temperature of the electronic device 100*b* reaches 70° C., the change in the roll angle, that is, the slope of the graph has a rather high value, but after the temperature of the electronic device 100*b* exceeds 70° C., the change of the roll angle is gentle.

When a temperature for distinguishing between a section in which a change in the rotation angle is large and a section in which a change in the rotation angle is small is referred to as a reference temperature, in the above example, the reference temperature may be 70° C. When a time point at which the electronic device 100*b* reaches the reference temperature is referred to as a reference time point, it may be seen that the change in the roll angle is different between before and after the reference temperature and the reference time point.

Figure 7:
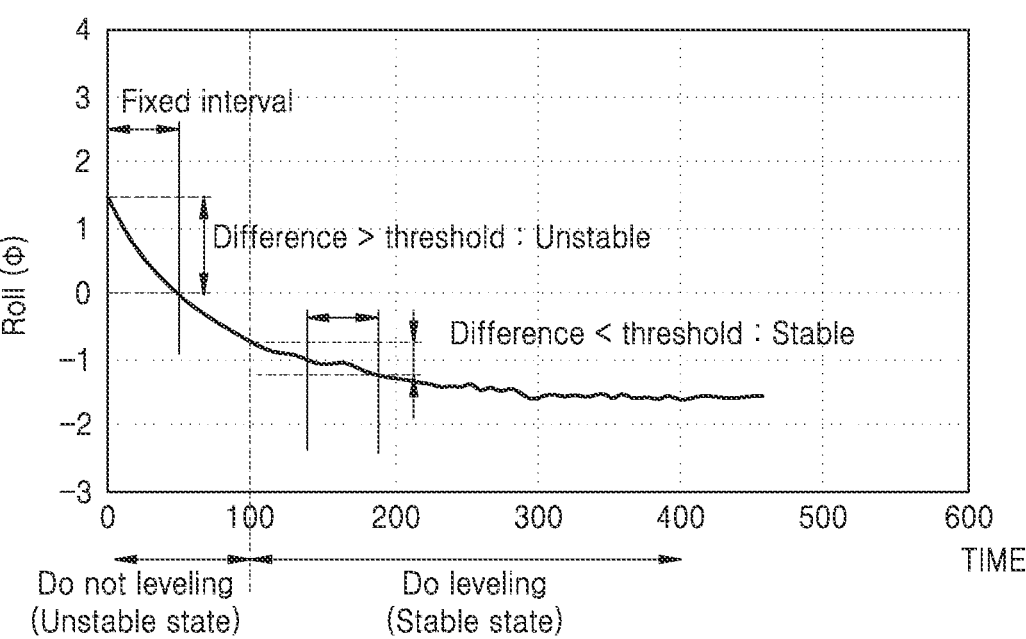
FIG. 7 is a diagram for describing a change in a rotation angle according to the internal temperature of an electronic device, according to an embodiment of the disclosure.

FIG. 7 is a diagram for describing a change in a rotation angle according to the internal temperature of an electronic device, according to an embodiment of the disclosure.

FIG. 7 is a graph showing a change in a roll angle φ calculated based on raw data obtained by using the acceleration sensor 101 included in the electronic device 100*b* when the internal temperature of the electronic device 100*b* changes as shown in the graph 610 of FIG. 6.

As shown in FIG. 7, the roll angle may be divided into a section with a large change in the rotation angle and a section with a small change in the rotation angle, based on a reference temperature and a reference time point corresponding to the reference temperature.

In FIG. 7, it may be seen that, when the reference time point corresponding to the reference temperature is 100, the change in the roll angle before the reference time point is greater than the change in the roll angle after the reference time point. That is, it may be seen that before the reference time point, the change in the roll angle during the same time interval is greater than a threshold value, whereas after the reference time point, the change in the roll angle during the same time interval is less than the threshold value.

That the change in the roll angle is large may mean that the sensor is in an unstable state. On the other hand, that the change in the roll angle may mean that the sensor is in a stable state.

Referring back to FIG. 5, as such, the stability identification unit 415 may distinguish between a section in which the change in the rotation angle is large and a section in which the change in the rotation angle is not large, and identify, as a stability section, the section in which the change in the rotation angle is not large.

The stability identification unit 415 may identify whether the sensor is stable, by using a change in raw data obtained by the sensor or a change in a rotation angle obtained as raw data.

The stability identification unit 415 may identify whether the acceleration sensor 101 is stable, by using Equation 3 below.

$$|\varphi(t) - \varphi(t-k)| < STh \qquad \text{[Equation 3]}$$

In Equation 3, $\varphi(t)$ denotes a current roll angle calculated based on raw data obtained from the acceleration sensor 101, and $\varphi(t-k)$ denotes a roll angle before k samples. STh denotes a preset reference threshold value for a change in roll angle.

The stability identification unit 415 may compare the difference between $\varphi(t)$ and $\varphi(t-k)$ with the preset threshold STh to determine whether the acceleration sensor 101 is stable. The difference between $\varphi(t)$ and $\varphi(t-k)$ over time may mean the slope of the graph of the roll angle over time. The stability identification unit 415 may identify whether the acceleration sensor 101 is stable, based on whether the change in the roll angle or the slope of the graph is large or small.

The stability identification unit 415 may perform Equation 3 only once, or may repeatedly perform Equation 3 a plurality of times. For example, when the number of times that the change in the roll angle satisfies Equation 3 is greater than or equal to a preset value, for example, N (N is a natural number greater than or equal to 2), the stability identification unit 415 may identify that the acceleration sensor 101 is stable.

Similarly, the stability identification unit 415 may identify whether the acceleration sensor 101 is stable, by using Equation 4 below.

$$|\theta(t){-}\theta(t{-}k)|{<}GTh \qquad \text{[Equation 4]}$$

In Equation 4, $\theta(t)$ denotes a current pitch angle calculated based on raw data obtained from the acceleration sensor 101, and $\theta(t{-}k)$ denotes a pitch angle before k samples. GTh denotes a preset reference threshold value for a change in pitch angle.

The stability identification unit 415 may compare the difference between $\theta(t)$ and $\theta(t{-}k)$ with the preset threshold GTh to determine whether the acceleration sensor 101 is stable.

The stability identification unit 415 may identify whether the acceleration sensor 101 is stable, by performing Equation 4 only once or by repeatedly performing Equation 4 a plurality of times. For example, when the number of times that the change in the pitch angle satisfies Equation 4 is greater than or equal to a preset value, for example, N (N is a natural number greater than or equal to 2), the stability identification unit 415 may identify that the acceleration sensor 101 is stable.

The stability identification unit 415 may identify whether the acceleration sensor 101 is stable, by using at least one of Equation 3 or Equation 4.

Similarly, the stability identification unit 415 may identify whether the distance sensor 103 is stable, by using a similar method on a yaw angle.

Figure 8:
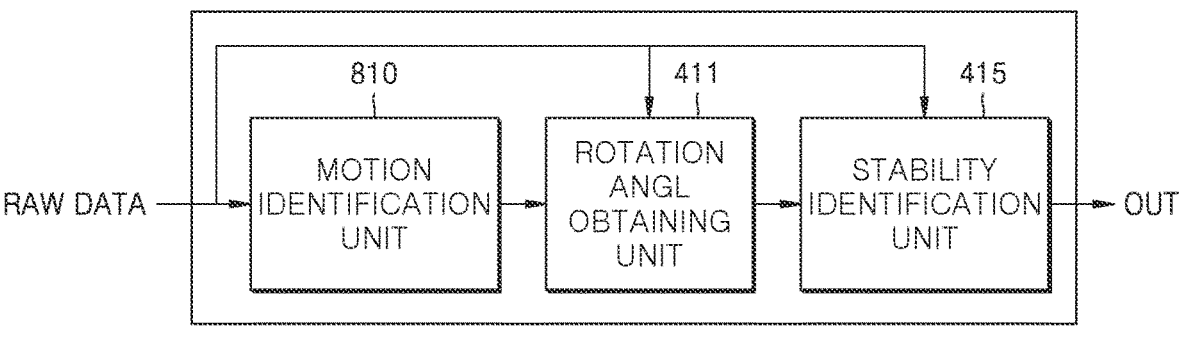
FIG. 8 is a diagram illustrating an example of the posture estimation unit of FIG. 4.

FIG. 8 is a diagram illustrating an example of the posture estimation unit of FIG. 4.

A posture estimation unit 410b of FIG. 8 is the same as the posture estimation unit 410a of FIG. 5, except that the posture estimation unit 410b further includes a motion identification unit 810. Hereinafter, descriptions provided above with reference to FIGS. 4 and 5 will be omitted.

The posture estimation unit 410b of FIG. 8 may further include the motion identification unit 810, in addition to the rotation angle obtaining unit 411 and the stability identification unit 415.

The motion identification unit 810 may identify a motion of the electronic device 100b.

Before the rotation angle obtaining unit 411 obtains a rotation angle by using sensing data, the electronic device 100b may first identify whether the electronic device 100b is moving, by using the motion identification unit 413.

When the electronic device 100b changes the projection angle or position automatically or manually by a physical force by the user, a force for moving the electronic device 100b acts on each axis of the acceleration sensor 101, together with the effect of gravitational acceleration. Thus, while the electronic device 100 is moved, the sensor senses the physical force in addition to the gravitational acceleration. In this case, it is impossible to identify exactly how much the electronic device 100b is inclined with respect to the direction of gravity.

In addition, when the electronic device 100b is moving, the distance and angle between the distance sensor 103 and the projection surface 105 change, and thus, a value sensed by the distance sensor 103 is highly likely to be inaccurate. Therefore, the distance between the electronic device 100b and the projection surface 105 may be accurately obtained only by using a sensing value obtained when the electronic device 100b is not moving.

The motion identification unit 810 may obtain, as raw data, an acceleration value obtained by the acceleration sensor 101. The motion identification unit 810 may identify a motion of the electronic device 100b by using an acceleration value at a certain time point and an acceleration value at a time point prior to the certain time point.

The motion identification unit 810 may normalize the difference between the acceleration values by using Equation 5 below.

$$Norm_{acc} = \qquad \text{[Equation 5]}$$
$$\sqrt{\{A_{bx}(t)-A_{bx}(t-1)\}^2 + \{A_{by}(t)-A_{by}(t-1)\}^2 + \{A_{bz}(t)-A_{bz}(t-1)\}^2}$$

$A_{bx}$, $A_{by}$, and $A_{bz}$ denote sensing values of x-, y-, and z-axis acceleration sensors, respectively, and t denotes a time point.

When a value obtained by using Equation 5 is greater than a threshold value, the motion identification unit 810 may determine that the electronic device 100b is moving. A sensor output value may be generated according to a change in a surrounding magnetic field or an environment even when the slope is fixed, and thus, the threshold value is not necessarily set to 0 and may be set considering a micro error range.

The motion identification unit 810 may identify a motion of the electronic device 100b by using raw data obtained by the distance sensor 103.

The motion identification unit 810 may receive, from the distance sensor 103, raw data at a certain time point and raw data at a time point prior to the certain time point a plurality of times, and identify a motion of the electronic device 100b by comparing a current measurement value with a previous measurement value.

The motion identification unit 810 may normalize a difference between the raw data obtained from the distance sensor 103 by using Equation 6 below.

$$Norm_{dist}=\sqrt{\{d_1(t)-d_1(t-1)\}^2+\{d_2(t)-d_2(t-1)\}^2} \qquad \text{[Equation 6]}$$

$d_1$ denotes a sensing value of each of two distance sensors 103, and t denotes a time point.

When a value obtained by Equation 6 is out of a threshold value, the motion identification unit 810 may determine that the electronic device 100b is moving. The threshold value is not necessarily set to 0, and may be set considering a micro error range.

The motion identification unit 810 may identify whether the electronic device 100b is moving, at regular time intervals or at random intervals.

The motion identification unit 810 may inform the rotation angle obtaining unit 411 whether the electronic device 100b is moving.

When it is determined that the electronic device 100b is not moving, the rotation angle obtaining unit 411 may obtain a pitch angle and a roll angle by using the raw data obtained from the acceleration sensor 101. Also, when it is determined that the electronic device 100*b* is not moving, the rotation angle obtaining unit 411 may obtain a yaw angle by using raw data obtained from the distance sensor 103.

The rotation angle obtaining unit 411 and the stability identification unit 415 may not perform an operation of calculating a rotation angle or determining the stability, until the electronic device 100*b* stops moving. Furthermore, the electronic device 100*b* may not perform keystone correction until the electronic device 100*b* stops moving.

Figure 9:
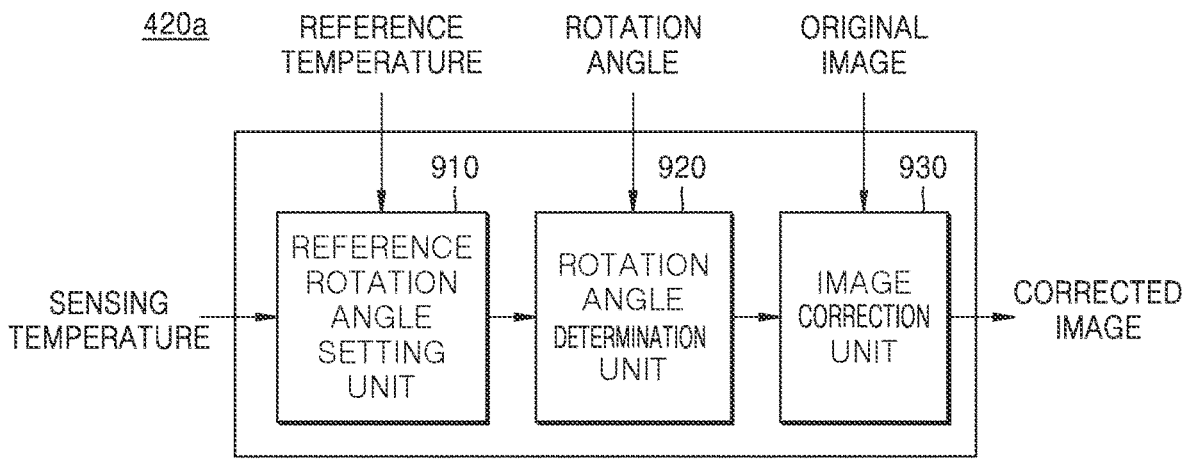
FIG. 9 is a diagram illustrating an example of an image processing unit of FIG. 4.

FIG. 9 is a diagram illustrating an example of the image processing unit of FIG. 4.

Referring to FIG. 9, an image processing unit 420*a* may include a reference rotation angle setting unit 910, a rotation angle determination unit 920, and an image correction unit 930.

The reference rotation angle setting unit 910 may obtain the temperature of the electronic device 100*b* from the temperature sensor 131, and obtain a reference temperature from the memory 120.

The reference rotation angle setting unit 910 may compare the temperature of the electronic device 100*b* with the reference temperature to identify whether the current temperature of the electronic device 100*b* is greater than the reference temperature.

The reference temperature may be a temperature to be used as a reference for distinguishing between a section in which the rotation angle changes by a large amount according to a change in the temperature of the electronic device 100*b*, and a section in which the rotation angle changes by a small amount according to a change in the temperature of the electronic device 100*b*.

The reference rotation angle setting unit 910 may set the reference rotation angle differently depending on whether the temperature of the electronic device 100*b* is greater than the reference temperature.

The reference rotation angle may refer to a rotation angle to be used as a reference for identifying whether a rotation angle obtained through the sensor is meaningful data.

The reference rotation angle setting unit 910 may set the reference rotation angle to an angle th1, based on the current temperature of the electronic device 100*b* being less than or equal to the reference temperature, and set the reference rotation angle to an angle th2, based on the current temperature being greater than the reference temperature. The angle th1 may be greater than the angle th2.

The electronic device 100*b* may predict that the change in the rotation angle will be gentle in a section in which the temperature of the electronic device 100*b* is greater than the reference temperature, and thus determine that the rotation angle obtained in the section is highly likely to be reliable data. Thus, the reference rotation angle setting unit 910 may set the reference rotation angle to a low angle when the current temperature is greater than the reference temperature, such that even when the rotation angle is relatively low, this data is used for performing keystone correction.

The electronic device 100*b* may predict that the rotation angle will change by a large amount in a section in which the temperature of the electronic device 100*b* is less than or equal to the reference temperature, and set the reference rotation angle to a high angle in the section, such that keystone correction is performed by using the rotation angle only when the rotation angle is relatively high.

The rotation angle determination unit 920 may receive the reference rotation angle from the reference rotation angle setting unit 910, and receive the rotation angle from the posture estimation unit 410.

The rotation angle determination unit 920 may compare the reference rotation angle with a rotation angle obtained as sensing data, to determine whether the rotation angle is greater than the reference rotation angle.

When the rotation angle obtained by the sensor is greater than the reference rotation angle, the rotation angle determination unit 920 may identify the rotation angle as meaningful data for image correction, and transmit the identified data to the image correction unit 930.

The rotation angle determination unit 920 may not consider the rotation angle when the rotation angle is less than or equal to the reference rotation angle. For example, when the rotation angle is less than or equal to the reference rotation angle, the rotation angle determination unit 920 may determine the rotation angle as 0 such that the rotation angle is not used for image correction.

The image correction unit 930 may correct an original image based on the rotation angle received from the rotation angle determination unit 920.

The image correction unit 930 may obtain a rotation matrix R by using a pitch angle, a roll angle, and a yaw angle received from the rotation angle determination unit 920 as below.

$$R = R_{x,\phi}R_{y,\theta}R_{z,\psi} \qquad \text{[Equation 7]}$$

$$R_{x,\phi} = \begin{bmatrix} 1 & 0 & 0 \\ 0 & \cos(\phi) & \sin(\phi) \\ 0 & -\sin(\phi) & \cos(\phi) \end{bmatrix}$$

$$R_{y,\theta} = \begin{bmatrix} \cos(\theta) & 0 & -\sin(\theta) \\ 0 & 1 & 0 \\ \sin(\theta) & 0 & \cos(\theta) \end{bmatrix}$$

$$R_{x,\psi} = \begin{bmatrix} \cos(\psi) & \sin(\psi) & 0 \\ -\sin(\psi) & \cos(\psi) & 0 \\ 0 & 0 & 1 \end{bmatrix}$$

By using a pitch angle, a roll angle, a yaw angle, a shortest distance ds from the sensor to the projection surface 105, and three-dimensional coordinates of four vertices of a rectangular image before rotation, the image correction unit 930 may calculate coordinates of the four vertices when a keystone effect occurs.

The image correction unit 930 may obtain a projection matrix P by using the pitch angle, the roll angle, the yaw angle, and the distance between the distance sensor 103 and the projection surface 105. The projection matrix P may be modeled as a homography. The projection matrix P is a matrix representing a relationship between points on a virtual plane without warping and points on an actual projection surface, and may be obtained based on the pixel positions of the four vertices of an image to be projected onto the projection surface 105 and estimated pixel positions of the four vertices on the projection surface 105 when a keystone effect occurs.

The image correction unit 930 may obtain a transformation matrix W by using the pitch angle, the roll angle, the yaw angle, and the distance between the distance sensor 103 and the projection surface 105. The image correction unit 930 may pre-warp, by using the projection matrix, the image to be projected onto the projection surface, to obtain the transformation matrix W for outputting, onto the projection surface, an image as rectangular as possible.

The image correction unit 930 may perform image processing for keystone correction by warping the original image based on the projection matrix and the transformation matrix.

Figure 10:
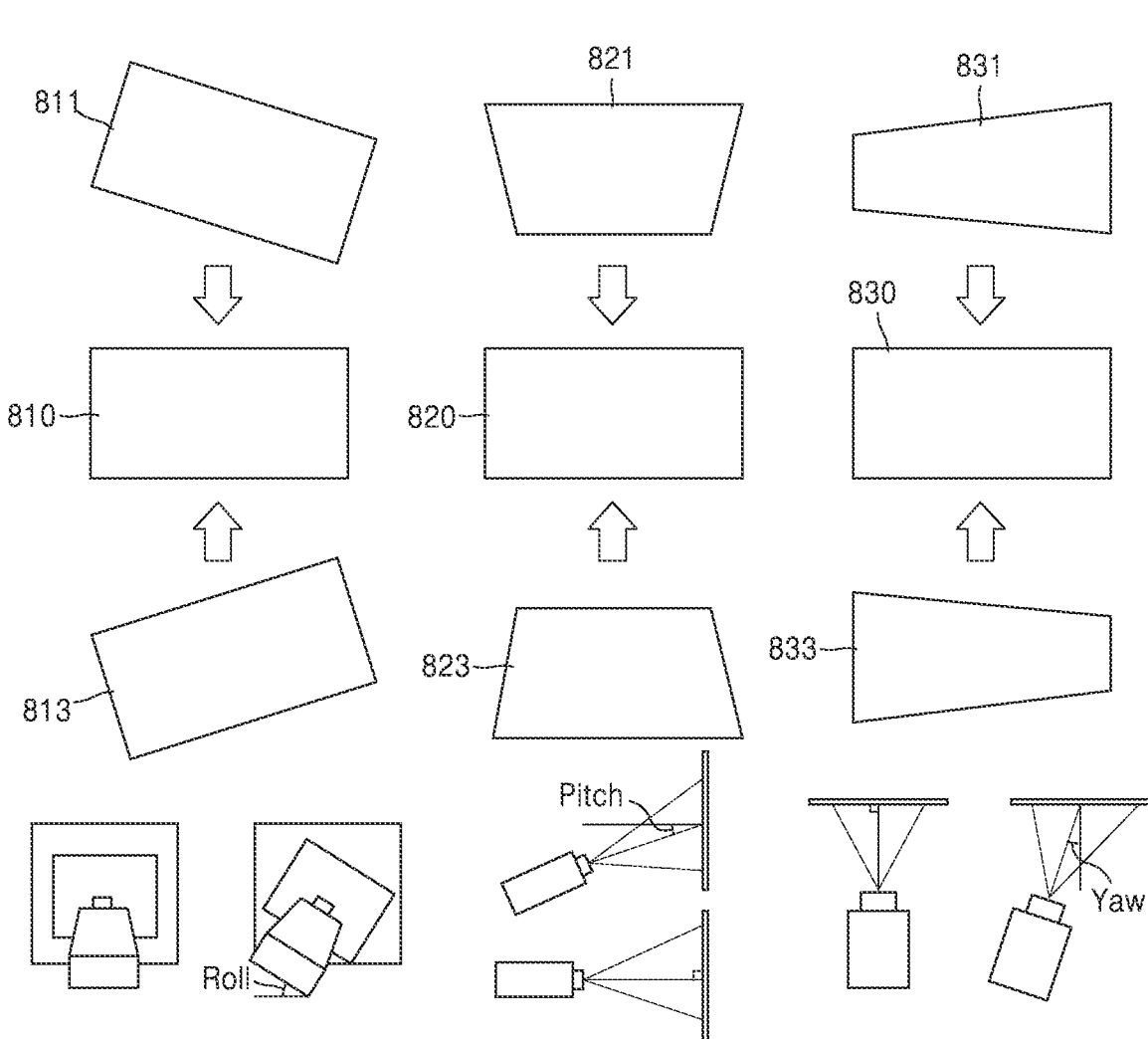
FIG. 10 is a diagram for describing that a keystone effect occurs according to a rotation angle.

FIG. 10 is a diagram for describing that a keystone effect occurs according to a rotation angle.

As illustrated in FIG. 1, when the pitch angle θ, the roll angle φ, and the yaw angle ψ are defined, the tilt of the electronic device 100*a* or 100*b* is in a normal state, and the electronic device 100*a* or 100*b* project an original image, an image without a keystone effect is displayed on the projection surface 105. The normal state is a state in which the pitch angle θ, the roll angle φ, and the yaw angle ψ are 0 or less than a reference value, and refers to a case in which, for example, the rotation angle between the electronic device 100*a* or 100*b* and the projection surface 105, the angle at which the electronic device 100*a* or 100*b* is tilted, are each within a reference value. In a general case, the reference value may be 0, but may be set to a value other than 0 depending on the position or the state of the surroundings of the electronic device 100*a* or 100*b*.

Referring to FIG. 10, when the electronic device 100*a* or 100*b* is tilted in the x-axis direction and the roll angle is different from a reference value (e.g., 0), an image projected onto the projection surface 105 appears in a rightward tilted shape 811 or a leftward tilted shape 813 according to the direction in which the electronic device 100*a* or 100*b* is tilted.

The image correction unit 930 may rotate the image in a direction opposite to the direction of the change in the roll angle such that a normal image 810 is displayed on the projection surface 105.

When the electronic device 100*a* or 100*b* is tilted in the y-axis direction and the pitch angle is different from a reference value (e.g., 0), an image projected onto the projection surface 105 appears in a trapezoidal shape 821 or 823 according to the direction in which the electronic device 100*a* or 100*b* is tilted.

The image correction unit 930 may perform correction to increase the length of the upper side or increase the length of the lower side, such that a normal image 820 is displayed on the projection surface 105.

When the electronic device 100*a* or 100*b* is tilted in the z-axis direction and the yaw angle is different from a reference value (e.g., 0), an image projected onto the projection surface 105 appears in a trapezoidal shape 831 or 833 having a left or right side shorter than another according to the direction in which the electronic device 100*a* or 100*b* is tilted.

The image correction unit 930 may perform correction to increase the length of the left side or increase the length of the right side, such that a normal image 830 is displayed on the projection surface 105.

Figure 11:
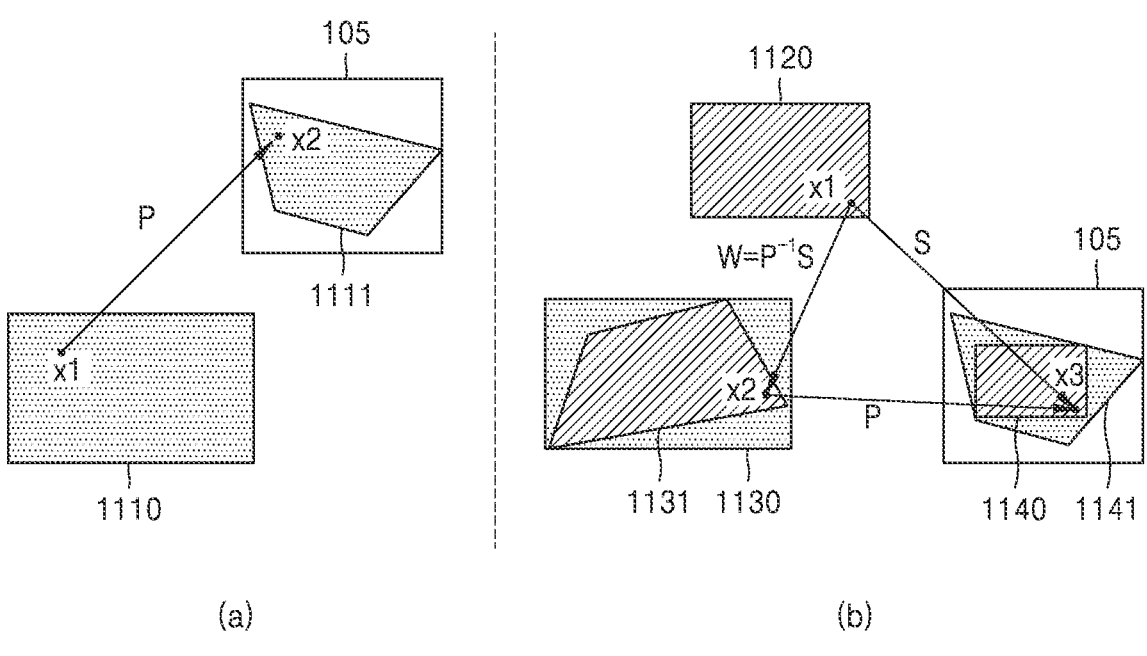
FIG. 11 is a diagram for describing warping of an image according to a keystone effect and an effect according to keystone correction.

FIG. 11 is a diagram for describing warping of an image according to a keystone effect and an effect according to keystone correction.

(a) of FIG. 11 is a diagram illustrating that an image is warped according to a keystone effect.

Referring to (a) of FIG. 11, when the electronic device 100*a* or 100*b* projects an original image frame 1110 having a rectangular shape, an image frame 1111 that is warped by a keystone effect may be displayed on the projection surface 105. A pixel x1 in the original image 1110 is displayed at a position x2 in the warped image frame 1111 on the projection surface 105, which is determined by a projection matrix.

(b) of FIG. 11 is a diagram for describing a case in which image processing is performed through keystone correction.

The image correction unit 930 may convert an original image 1120 into a corrected image 1131 in order to correct a keystone effect.

The processor 110 may control the projection unit 150 to project an image frame 1130 including the corrected image 1131 generated by the image correction unit 930. Accordingly, even when a keystone effect occurs on the projection surface 105 and the image frame 1130 is warped, the corrected image 1131 is expressed as a rectangular projection image 1140. The position of one pixel x1 in the original image 1120 is located at the point x2 in the corrected image 1131 by the projection matrix P and a scaling matrix S, and is located at a point x3 in the image 1140 displayed on the projection surface 105.

The processor 110 or the image correction unit 930 may identify whether an image to be actually displayed is within a preset region of the projection surface 105, by comparing the coordinates of the four vertices of the image to be displayed on the projection surface 105, with the coordinates of the four vertices of the image displayed on the projection surface 105 in a normal state at the same distance, that is, in a state in which the pitch angle, the roll angle, and the yaw angle are all 0 or fixed as reference values.

When the image projected onto the projection surface 105 exceeds the preset region in the projection surface 105, the processor 110 may project the image within the preset region by controlling the size of a keystone-corrected image. For example, the preset region may be a region within a size range of the projection surface 105.

When the projected image is located within the preset region, the processor 110 or the image correction unit 930 sets a scale parameter such that the size of the image is maximized within the range. In this case, when there is a user manipulation, the image correction unit 930 may reduce the size of the image by adjusting the scale parameter.

Figure 12:
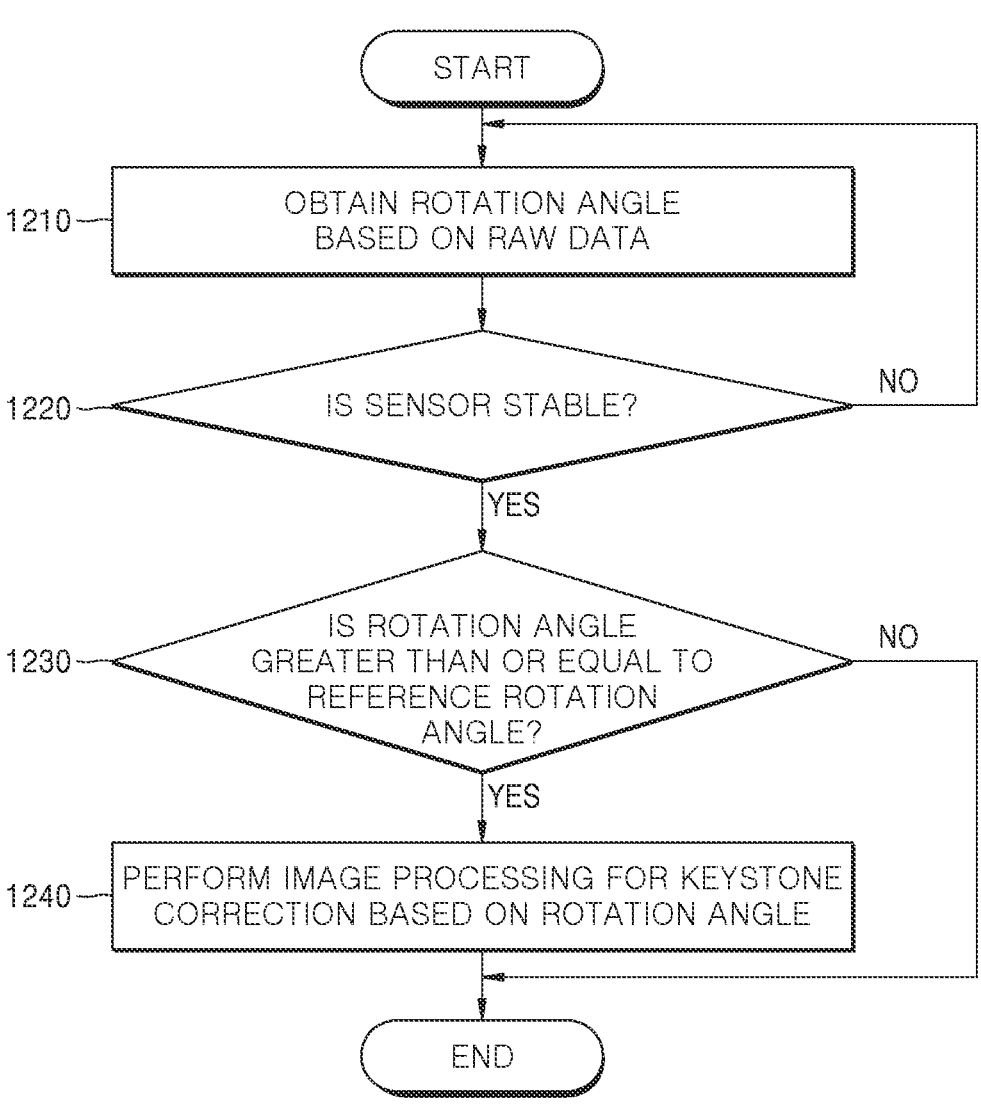
FIG. 12 is a flowchart illustrating an operating process of an electronic device, according to an embodiment of the disclosure.

FIG. 12 is a flowchart illustrating an operating process of the electronic device 100*a* or 100*b*, according to an embodiment of the disclosure.

Referring to FIG. 12, the electronic device 100*a* or 100*b* may obtain a rotation angle based on raw data (operation 1210).

The electronic device 100*a* or 100*b* may obtain, as raw data, three-axis acceleration values obtained by using the acceleration sensor 101, and obtain a roll angle and a pitch angle based on the values.

The electronic device 100*a* or 100*b* may obtain a yaw angle based on raw data obtained by using the distance sensor 103.

The electronic device 100*a* or 100*b* may identify whether the sensor is stable (operation 1220).

The electronic device 100*a* or 100*b* may identify whether the sensor is stable, based on at least one of the raw data or the rotation angle.

For example, the electronic device 100*a* or 100*b* may identify whether the acceleration sensor 101 is stable, by comparing a current acceleration value obtained from the acceleration sensor 101 with an acceleration value before k samples to identify whether the difference therebetween is greater than or equal to a preset threshold value.

Alternatively, the electronic device 100*a* or 100*b* may identify whether the acceleration sensor 101 is stable, by comparing the difference between a current roll angle calculated based on raw data obtained from the acceleration sensor 101 and a roll angle before k samples, with a preset threshold value.

The electronic device 100*a* or 100*b* may perform, a preset number of times, an operation of comparing the difference between roll angles with a threshold value, and based on the number of time that the difference between the roll angles is less than the threshold value is greater than a preset value, for example, 5 or greater, identify that the acceleration sensor 101 is stable.

When it is identified that the sensor is stable, the electronic device 100*a* or 100*b* may identify whether the rotation angle is greater than or equal to a reference rotation angle (operation 1230).

When the rotation angle is greater than or equal to the reference angle, the electronic device 100*a* or 100*b* may perform image processing for keystone correction based on the rotation angle (operation 1240).

The electronic device 100*a* or 100*b* may not consider the rotation angle in performing the keystone correction, unless the rotation angle is greater than or equal to the reference angle. For example, when a pitch angle and a roll angle among rotation angles are greater than or equal to the reference rotation angle, respectively, but a yaw angle is less than the reference rotation angle, the electronic device 100*a* or 100*b* may perform the image processing for keystone correction considering only the pitch angle and the roll angle and not considering the yaw angle.

Figure 13:
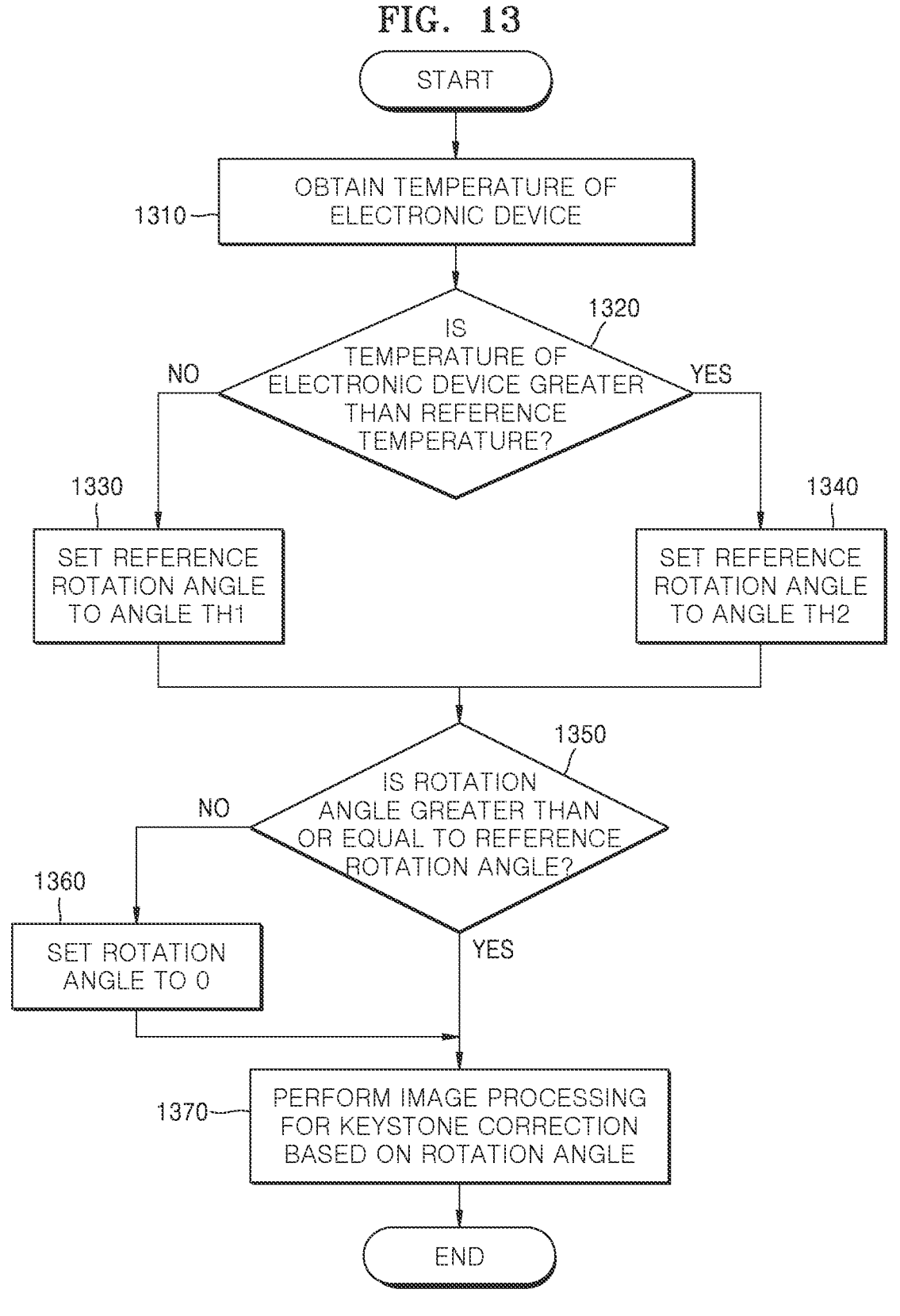
FIG. 13 is a flowchart illustrating an operating process of an electronic device, according to an embodiment of the disclosure.

FIG. 13 is a flowchart illustrating an operating process of the electronic device 100*a* or 100*b*, according to an embodiment of the disclosure.

Referring to FIG. 13, the electronic device 100*a* or 100*b* may obtain the temperature of the electronic device 100*a* or 100*b* (operation 1310).

In The electronic device 100*a* or 100*b* may include a temperature sensor. The electronic device 100*a* or 100*b* may obtain the current temperature of the electronic device 100*a* or 100*b* in real time by using the temperature sensor.

The electronic device 100*a* or 100*b* may obtain a reference temperature from, for example, the memory 120.

The electronic device 100*a* or 100*b* may compare the temperature of the electronic device 100*a* or 100*b* with the reference temperature (operation 1320).

Based on determining that the temperature of the electronic device 100*a* or 100*b* is less than or equal to the reference temperature, the electronic device 100*a* or 100*b* may set the reference rotation angle to the angle th1 (operation 1330).

Based on determining that the temperature of the electronic device 100*a* or 100*b* is greater than the reference temperature, the electronic device 100*a* or 100*b* may set the reference rotation angle to the angle th2 (operation 1330). The angle th1 may be greater than the angle th2.

The electronic device 100*a* or 100*b* may identify whether a rotation angle is greater than or equal to the reference rotation angle (operation 1350).

The reference rotation angle may be set differently in operations 1330 and 1340 according to the temperature of the electronic device 100*a* or 100*b*.

Based on determining that the rotation angle is not greater than or equal to the reference rotation angle, the electronic device 100*a* or 100*b* may set the rotation angle to 0 (operation 1360).

Based on determining that the rotation angle is greater than or equal to the reference rotation angle, the electronic device 100*a* or 100*b* may perform image processing for keystone correction based on the rotation angle (operation 1370).

For example, when the temperature of the electronic device 100*a* or 100*b* is greater than the reference temperature and the roll angle is greater than or equal to the angle th2, the electronic device 100*a* or 100*b* may perform image processing based on the roll angle.

For example, when the temperature of the electronic device 100*a* or 100*b* is greater than the reference temperature and the roll angle is less than the angle th2, the electronic device 100*a* or 100*b* may set the roll angle to 0.

For example, when the temperature of the electronic device 100*a* or 100*b* is less than the reference temperature and the pitch angle is greater than or equal to the angle th1, the electronic device 100*a* or 100*b* may perform image processing based on the pitch angle.

For example, when the temperature of the electronic device 100*a* or 100*b* is less than the reference temperature and the pitch angle is less than the angle th1, the electronic device 100*a* or 100*b* may set the rotation angle to 0.

Figure 14:
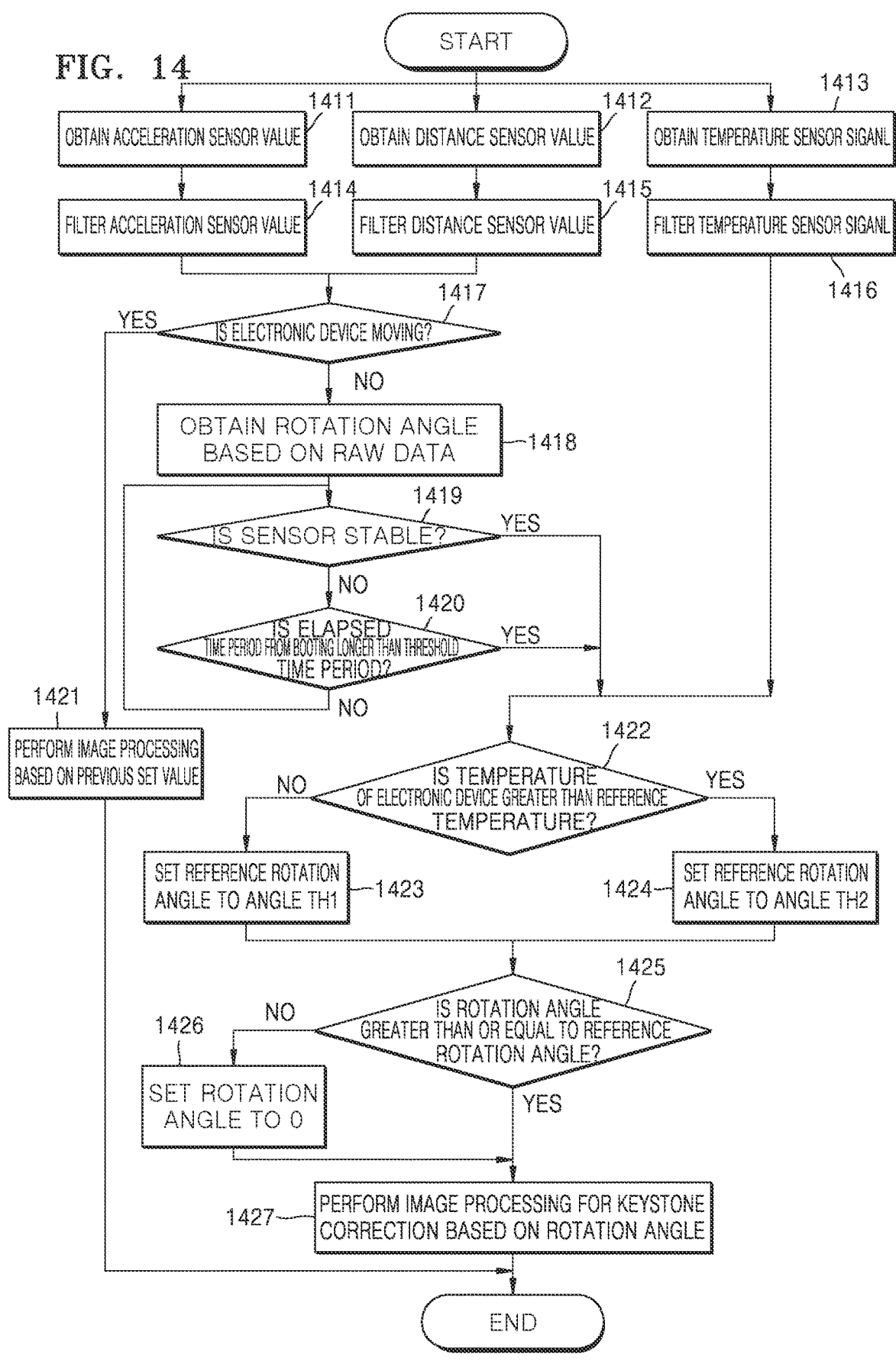
FIG. 14 is a flowchart illustrating an operating process of an electronic device, according to an embodiment of the disclosure.

FIG. 14 is a flowchart illustrating an operating process of the electronic device 100*a* or 100*b*, according to an embodiment of the disclosure.

Referring to FIG. 14, the electronic device 100*a* or 100*b* may obtain raw data by using a sensor. The electronic device 100*a* or 100*b* may obtain an acceleration sensor value by using the acceleration sensor 101 (operation 1411). The electronic device 100*a* or 100*b* may obtain an acceleration sensor value for each of the x-, y-, and z-axes.

The electronic device 100*a* or 100*b* may obtain a distance sensor value by using the distance sensor 103 (operation 1412). The electronic device 100*a* or 100*b* may obtain distance sensor values by using two distance sensors 103, respectively.

The electronic device 100*a* or 100*b* may obtain a temperature sensor signal by using the temperature sensor 131 (operation 1413).

The electronic device 100*a* or 100*b* may perform an operation of removing noise from the sensor values. The electronic device 100*a* or 100*b* may filter the sensor values to remove noise included in the sensor values. The electronic device 100*a* or 100*b* may filter the sensor values or sensor signals obtained from the sensors, by using, for example, a low-pass filter, and/or a moving average.

The electronic device 100*a* or 100*b* may filter the acceleration sensor value (operation 1414). The electronic device 100*a* or 100*b* may obtain acceleration sensor values by using the acceleration sensor 101 for a preset time period, and then remove noise from the acceleration sensor values obtained for the preset time period. Alternatively, the electronic device 100*a* or 100*b* may filter, in real time, the acceleration sensor value obtained by using the acceleration sensor 101.

The electronic device 100*a* or 100*b* may filter the distance sensor value (operation 1415). The electronic device 100*a* or 100*b* may obtain distance sensor values by using the distance sensor 103 for a preset time period, and then remove noise from the distance sensor values obtained for the preset time period, or may filter, in real time, the distance sensor value obtained by using the distance sensor 103.

The electronic device 100*a* or 100*b* may filter the temperature sensor signal (operation 1416). The electronic device 100*a* or 100*b* may obtain temperature sensor signals by using the temperature sensor 131 for a preset time period, and remove noise by performing, for example, a low-pass filter, and/or a moving average on the temperature sensor signals obtained for the preset time period. Alternatively, the electronic device 100*a* or 100*b* may filter the temperature sensor signal in real time.

The electronic device 100*a* or 100*b* may determine whether the electronic device 100*a* or 100*b* is moving, based on at least one of the acceleration sensor value or the distance sensor value (operation 1417).

The electronic device 100a or 100b may identify whether the electronic device 100a or 100b is moving, by using an acceleration sensor value at a certain time point and an acceleration sensor value at a time point prior to the certain time point. The electronic device 100a or 100b may determine whether the electronic device 100a or 100b is moving, by obtaining, with respect to the acceleration sensor values obtained for each of the x-, y-, and z-axes, the difference between the acceleration sensor value at a certain time point and the acceleration sensor value at a time point prior to the certain time point, and by normalizing the difference. When the normalized value is greater than a threshold value, the electronic device 100a or 100b may determine that the electronic device 100a or 100b is moving.

The electronic device 100a or 100b may receive, a plurality of times, a distance sensor value at a certain time point and a distance sensor value at a time point prior to the certain time point with respect to the distance sensor values of the two distance sensors 103, and compare a current measurement value with a previous measurement value. The electronic device 100a or 100b may determine whether the electronic device 100a or 100b is moving, by obtaining the difference between the distance sensor value at the certain time point and the distance sensor value at the time point prior to the certain time point, and normalizing the difference. When the normalized value is greater than a threshold value, the electronic device 100a or 100b may determine that the electronic device 100a or 100b is moving.

Based on determining that the electronic device 100a or 100b is not moving, the electronic device 100a or 100b may obtain a rotation angle based on raw data (operation 1418). The raw data may include at least one of the filtered acceleration sensor value or the filtered distance sensor value.

The electronic device 100a or 100b may obtain at least one of a pitch angle or a roll angle of the electronic device 100a or 100b with respect to the direction of gravity by using the filtered acceleration sensor value.

The electronic device 100a or 100b may obtain a yaw angle of the electronic device 100a or 100b with respect to the projection surface 105 by using the filtered distance sensor value.

Based on determining that the electronic device 100a or 100b is moving, the electronic device 100a or 100b may perform image processing based on a previous set value (operation 1421). The previous set value may include a parameter value previously used for performing image processing for keystone correction.

For example, when the electronic device 100a or 100b is moving by the user manipulating the position or projection angle thereof, or by the electronic device 100a or 100b automatically executing, for example, a zoom function, the electronic device 100a or 100b may prevent the operation thereof from being delayed, by performing image processing based on the previous set value and projecting a processed image.

Based on determining that the electronic device 100a or 100b is not moving, the electronic device 100a or 100b may identify whether the sensor is stable (operation 1419). The electronic device 100a or 100b may identify whether the sensor is stable, based on raw data or a rotation angle obtained based on the raw data.

The electronic device 100a or 100b may identify whether the sensor is stable, by identifying whether a difference value between a value at the time point t and a value at the time point t–k in the raw data is less than or equal to a threshold value. Alternatively, the electronic device 100a or 100b may identify whether the sensor is stable, by identifying whether the difference between a value at the time point t and a value at the time point t–k in rotation angles obtained based on the raw data is less than or equal to a threshold value.

The electronic device 100a or 100b may identify that the sensor is stable, when the number of times that the difference between a value at the time point t and a value at the time point t–k in at least one of raw data or rotation angles is less than or equal to a threshold value is a preset number.

Based on determining that the sensor is not stable, the electronic device 100a or 100b may determine whether an elapsed time period from a time point of booting is longer than a threshold time period (operation 1420). While the elapsed time period from the time point at which the electronic device 100a or 100b is booted is within the threshold time period, the electronic device 100a or 100b may continuously determine whether the sensor is stable.

In the electronic device 100a or 100b, the light source starts to generate heat at a time point of booting and the temperature changes for a certain time period or until the temperature reaches a certain temperature. Therefore, in many cases, a time point at which the sensor is affected by the change in the temperature of the electronic device 100a or 100b is before the threshold time period elapses from the time point of booting. Accordingly, until the threshold time period elapses from the time point at which the electronic device 100a or 100b is booted, the electronic device 100a or 100b may continuously determine whether the sensor is stable.

Based on determining that the sensor is not stable even when the threshold time period elapses from the time point of booting, the electronic device 100a or 100b may perform the next operation without performing the stability determination.

When the threshold time period elapses from the time point of booting or based on determining that the sensor is stable, the electronic device 100a or 100b may determine whether the temperature of the electronic device 100a or 100b is greater than the reference temperature (operation 1422).

The electronic device 100a or 100b may obtain the temperature of the electronic device 100a or 100b from the temperature sensor 131, and obtain the reference temperature from the memory 120.

Based on determining that the temperature of the electronic device 100a or 100b is not greater than the reference temperature, the electronic device 100a or 100b may set the reference rotation angle to the angle th1 (operation 1423).

Based on determining that the temperature of the electronic device 100a or 100b is greater than the reference temperature, the electronic device 100a or 100b may set the reference rotation angle to the angle th2 (operation 1424).

The electronic device 100a or 100b may determine whether a rotation angle is greater than or equal to the reference rotation angle (operation 1425).

Based on determining that the rotation angle is not greater than or equal to the reference rotation angle, the electronic device 100a or 100b may set the rotation angle to 0 (operation 1426).

Based on determining that the rotation angle is greater than or equal to the reference rotation angle, the electronic device 100a or 100b may perform image processing for keystone correction based on the rotation angle (operation 1427).

An electronic device and an operation method thereof may be implemented as a recording medium including computer-executable instructions such as a computer-executable program module. A computer-readable medium may be any available medium which is accessible by a computer, and may include a volatile or non-volatile medium and a removable or non-removable medium. Also, the computer-readable media may include computer storage media and communication media. The computer storage media include both volatile and non-volatile, removable and non-removable media implemented in any method or technique for storing information such as computer readable instructions, data structures, program modules or other data. The communication media typically include computer-readable instructions, data structures, program modules, other data of a modulated data signal, or other transmission mechanisms, and examples thereof include an arbitrary information transmission medium.

In addition, the electronic device and the operation method thereof described above may be implemented as a computer program product including a computer-readable recording medium/storage medium having recorded thereon a program for implementing the operation method of the electronic device including obtaining, based on raw data obtained by using a sensor included in the electronic device, a rotation angle of the electronic device, identifying, based on at least one of the raw data or the rotation angle, whether the sensor is stable, in response to identifying that the sensor is stable, identifying whether the rotation angle is greater than or equal to a reference rotation angle, and in response to the rotation angle being greater than or equal to the reference rotation angle, performing, based on the rotation angle, image processing for keystone correction.

A machine-readable storage medium may be provided in the form of a non-transitory storage medium. The term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

The methods may be included in a computer program product and then provided. The computer program products may be traded as commodities between sellers and buyers. The computer program product may be distributed in the form of a machine-readable storage medium (e.g., a compact disc ROM (CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

The invention claimed is:

1. An electronic device comprising:
a sensing unit comprising a sensor that comprises a temperature sensor;
a memory storing one or more instructions; and
one or more processors configured to execute the one or more instructions stored in the memory to:
obtain, based on raw data obtained from the sensor, a rotation angle of the electronic device,
identify, based on a difference value for a preset time period in at least one of the raw data or the rotation angle, whether the sensor is stable,
identify whether a temperature of the electronic device obtained from the temperature sensor is greater than a reference temperature,
determine a reference rotation angle for keystone correction differently based on whether the temperature of the electronic device obtained from the temperature sensor is greater than the reference temperature,
in response to identifying that the sensor is stable, identify whether the rotation angle is greater than or equal to the reference rotation angle, and
in response to identifying that the rotation angle is greater than or equal to the reference rotation angle, perform a keystone correction based on the rotation angle.

2. The electronic device of claim 1, wherein the sensor comprises an acceleration sensor,
wherein the one or more processors are further configured to execute the one or more instructions to obtain, based on raw data obtained from the acceleration sensor, a rotation angle of the electronic device with respect to a direction of gravity, and
wherein the rotation angle of the electronic device with respect to the direction of gravity comprises at least one of a pitch angle or a roll angle of the electronic device with respect to the direction of gravity.

3. The electronic device of claim 2, wherein the sensor further comprises a distance sensor facing a projection surface,
wherein the one or more processors are further configured to execute the one or more instructions to obtain, based on raw data obtained from the distance sensor, a rotation angle of the electronic device with respect to the projection surface, and
wherein the rotation angle of the electronic device with respect to the projection surface comprises a yaw angle.

4. The electronic device of claim 3, wherein the one or more processors are further configured to execute the one or more instructions to correct an image projected onto the projection surface, by using at least one of the pitch angle, the roll angle, or the yaw angle.

5. The electronic device of claim 1, wherein the one or more processors are further configured to execute the one or more instructions to identify whether the sensor is stable by identifying whether the difference value between a value at a time point t and a value of a time point t–k in the at least one of the raw data or the rotation angle is less than or equal to a threshold value.

6. The electronic device of claim 5, wherein the one or more processors are further configured to execute the one or more instructions to identify that the sensor is stable in response to identifying, N times or more (where N is a natural number greater than or equal to 2), that the difference value is less than or equal to the threshold value.

7. The electronic device of claim 1, wherein the one or more processors are further configured to execute the one or more instructions to:
identify, based on the raw data, a motion of the electronic device, and
obtain the rotation angle of the electronic device in response to identifying that there is no motion of the electronic device based on the raw data obtained by using the sensor.

8. The electronic device of claim 1, wherein the one or more processors are further configured to execute the one or more instructions to:

identify whether the temperature of the electronic device obtained from the temperature sensor is greater than the reference temperature, based on the temperature of the electronic device being less than or equal to the reference temperature, set the reference rotation angle to an angle th1, and based on the temperature of the electronic device being greater than the reference temperature, set the reference rotation angle to an angle th2, the angle th1 being greater than the angle th2.

9. The electronic device of claim 1, wherein the one or more processors are further configured to execute the one or more instructions to, in response to the rotation angle being less than the reference rotation angle, set the rotation angle to zero.

10. An operation method of an electronic device, the operation method comprising:

obtaining, based on raw data obtained from a sensor, a rotation angle of the electronic device;

identifying, based on a difference value for a preset time period in at least one of the raw data or the rotation angle, whether the sensor is stable;

identifying whether a temperature of the electronic device obtained from a temperature sensor is greater than a reference temperature;

determining a reference rotation angle for keystone correction differently based on whether the temperature of the electronic device obtained from the temperature sensor is greater than the reference temperature;

in response to identifying that the sensor is stable, identifying whether the rotation angle is greater than or equal to the reference rotation angle; and in response to identifying that the rotation angle is greater than or equal to the reference rotation angle, performing a keystone correction based on the rotation angle.

11. The operation method of claim 10, wherein the sensor includes an acceleration sensor;

wherein the obtaining the rotation angle of the electronic device comprises obtaining, based on raw data obtained from the acceleration sensor, a rotation angle of the electronic device with respect to a direction of gravity, and wherein the rotation angle of the electronic device with respect to the direction of gravity includes at least one of a pitch angle or a roll angle of the electronic device with respect to the direction of gravity.

12. The operation method of claim 11, wherein the sensor further includes a distance sensor facing a projection surface, wherein the obtaining the rotation angle of the electronic device comprises obtaining, based on raw data obtained from the distance sensor, a rotation angle of the electronic device with respect to the projection surface, and wherein the rotation angle of the electronic device with respect to the projection surface includes a yaw angle.

13. The operation method of claim 12, wherein the performing the keystone correction comprises correcting an image projected onto the projection surface, by using at least one of the pitch angle, the roll angle, or the yaw angle.

14. The operation method of claim 10, wherein the identifying whether the sensor is stable comprises identifying whether the difference value between a value at a time point t and a value of a time point t–k in the at least one of the raw data or the rotation angle is less than or equal to a threshold value.

15. The operation method of claim 14, wherein the identifying whether the sensor is stable further comprises identifying that the sensor is stable, in response to identifying, N times or more (where N is a natural number greater than or equal to 2), that the difference value is less than or equal to the threshold value.

16. The operation method of claim 10, further comprising identifying, based on the raw data, a motion of the electronic device, wherein the obtaining the rotation angle of the electronic device is in response to identifying that there is no motion of the electronic device.

17. The operation method of claim 10, further comprising identifying whether the temperature of the electronic device obtained from the temperature sensor is greater than the reference temperature, wherein the determining the reference rotation angle comprises:

based on the temperature of the electronic device being less than or equal to the reference temperature, setting the reference rotation angle to an angle th1; and based on the temperature of the electronic device being greater than the reference temperature, setting the reference rotation angle to an angle th2, the angle th1 being greater than the angle th2.

18. A non-transitory computer-readable recording medium having recorded thereon a program for a computer to perform an operation method comprising:

obtaining, based on raw data obtained from a sensor, a rotation angle of an electronic device;

identifying, based on a difference value for a preset time period in at least one of the raw data or the rotation angle, whether the sensor is stable;

identifying whether a temperature of the electronic device obtained from a temperature sensor is greater than a reference temperature;

determining a reference rotation angle for keystone correction differently based on whether the temperature of the electronic device obtained from the temperature sensor is greater than the reference temperature;

in response to identifying that the sensor is stable, identifying whether the rotation angle is greater than or equal to the reference rotation angle; and in response to identifying that the rotation angle is greater than or equal to the reference rotation angle, performing a keystone correction based on the rotation angle.

* * * * *